(12) United States Patent  (10) Patent No.: US 8,167,327 B2
Chamberlain  (45) Date of Patent: May 1, 2012

(54) BICYCLE FRAME

(75) Inventor: Jason L. Chamberlain, Morgan Hill, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 168 days.

(21) Appl. No.: 12/780,753

(22) Filed: May 14, 2010

(65) Prior Publication Data

US 2011/0278816 A1  Nov. 17, 2011

(51) Int. Cl.
  *B62K 19/20* (2006.01)
  *B62K 19/02* (2006.01)
  *B62K 19/32* (2006.01)
(52) U.S. Cl. ....................................................... 280/279
(58) Field of Classification Search .................. 280/274, 280/279, 280, 281.1; D12/111, 117, 118
  See application file for complete search history.

(56) References Cited

U.S. PATENT DOCUMENTS

| | | |
|---|---|---|
| 587,337 A | 8/1897 | Smith |
| 869,476 A | 10/1907 | Beck |
| 3,866,946 A | 2/1975 | Robison |
| 4,051,704 A | 10/1977 | Kimura |
| 4,580,427 A | 4/1986 | Akamatsu |
| 4,582,343 A | 4/1986 | Waugh |
| 4,600,207 A | 7/1986 | Zosi |
| 4,789,174 A | 12/1988 | Lawwill |
| 4,918,969 A | 4/1990 | Takeuchi et al. |
| 5,121,937 A | 6/1992 | Lawwill |
| 5,226,674 A | 7/1993 | Buell et al. |
| 5,273,301 A | 12/1993 | Klein |
| 5,460,396 A | 10/1995 | Sutter et al. |
| 5,938,225 A | 8/1999 | Scheibe et al. |
| 6,085,405 A | 7/2000 | Kao |
| 6,086,080 A | 7/2000 | Scheffer |
| 6,151,948 A | 11/2000 | Ashworth et al. |
| 6,170,845 B1 | 1/2001 | Tseng |
| 6,203,042 B1 | 3/2001 | Wilcox |
| 6,375,210 B1 | 4/2002 | Lam |
| 6,378,885 B1 | 4/2002 | Ellsworth et al. |
| 6,471,230 B2 | 10/2002 | Ellsworth et al. |

(Continued)

FOREIGN PATENT DOCUMENTS

DE  744465  1/1944

(Continued)

OTHER PUBLICATIONS

International Search Report and Written Opinion for International Application No. PCT/US2011/028372 mailed Apr. 28, 2011.

(Continued)

*Primary Examiner* — Paul N Dickson
*Assistant Examiner* — Wesley Potter
(74) *Attorney, Agent, or Firm* — Knobbe Martens Olson & Bear LLP

(57) ABSTRACT

A bicycle assembly can include a bicycle frame that can have a head tube, a top tube and a down tube. The top tube and down tube can be attached to the head tube. The head tube can include at least one ledge configured to fit inside either of the top and down tubes. The top of the top tube and/or the bottom of the down tube can be substantially flush with the top of the head tube or bottom of the head tube, respectively.

21 Claims, 20 Drawing Sheets

U.S. PATENT DOCUMENTS

| | | |
|---|---|---|
| 6,481,523 B1 | 11/2002 | Noro et al. |
| 6,595,538 B2 | 7/2003 | Ellsworth et al. |
| 6,609,437 B2 | 8/2003 | Jiang |
| 6,682,088 B1 | 1/2004 | Lin |
| 6,783,158 B2 | 8/2004 | Nakagawa et al. |
| 6,805,372 B2 | 10/2004 | Gueugneaud |
| 6,843,494 B2 | 1/2005 | Lam |
| 6,845,998 B2 | 1/2005 | Probst |
| 6,854,753 B2 | 2/2005 | Turner |
| 6,880,847 B2 | 4/2005 | Chamberlain et al. |
| 7,052,028 B2 | 5/2006 | Chamberlain |
| 7,052,029 B2 | 5/2006 | Chamberlain et al. |
| 7,059,620 B2 | 6/2006 | Chamberlain et al. |
| 7,506,528 B2 | 3/2009 | Chamberlain |
| 8,042,822 B2 * | 10/2011 | D'Aluisio ............. 280/274 |
| 2003/0038449 A1 | 2/2003 | Gueugneaud |
| 2004/0239071 A1 | 12/2004 | Chamberlain et al. |
| 2006/0284394 A1 | 12/2006 | Chamberlain et al. |
| 2009/0224507 A1* | 9/2009 | Hu ........................ 280/279 |
| 2011/0241309 A1* | 10/2011 | Rioux et al. ........... 280/279 |

FOREIGN PATENT DOCUMENTS

| | | |
|---|---|---|
| DE | 20217875 | 4/2003 |
| EP | 1238900 | 9/2002 |
| JP | 53077868 | 7/1978 |
| JP | 55153632 | 11/1980 |
| JP | 58081531 | 5/1983 |
| JP | 03231087 A * | 10/1991 |
| JP | 10-94879 A | 4/1998 |
| JP | 2006-290139 A | 10/2006 |
| TW | 220395 | 8/2004 |

OTHER PUBLICATIONS

European Search Report Application No. EP 04 01 2219, dated Apr. 21, 2006.

Ellsworth Internet Materials, http://www.ellsworthbikes.com/bikes/id/index.cfm dated Nov. 18, 2004 in 5 pages.

* cited by examiner

BICYCLE FRAME

BACKGROUND OF THE INVENTION

1. Field of the Invention

The present invention relates generally to bicycle frame assemblies. In particular, the present invention relates to configurations for main frames including a head tube, a top tube and a down tube.

2. Description of the Related Art

Bicycles with frames fabricated from aluminum tubing have become increasingly popular. This can include tubes of standard and/or oversized tubing. Generally, the joints between the tubes of most aluminum bicycle frames are welded. An important junction in modern bicycle frames is the where the top tube, and the down tube meet up with the head tube. One reason for this is that the fork, which interfaces with the frame via a set of bearings known as a headset mounted in the head tube, acts as a long lever arm and can exert significant amounts of stress on the head tube. This stress can impact handling as well as the durability of the frame, as the top and/or down tubes may want to separate from the head tube because of the stresses experienced. The junction between the head tube and the top and down tubes can be particularly important in suspension bikes with large tires and/or stiff long-travel suspension forks which serve to increase the amount of stress experienced at the head tube. This is in addition to the stress experienced when absorbing bumps, and other rough trail conditions, which may be encountered while riding off-road.

Top tubes and down tubes have been getting bigger to achieve greater strength and rigidity. This has created problems in trying to accommodate the larger top and down tubes. The top and down tubes may be down sized at the head tube end to mate with a standard sized head tube. However, this reduces the effectiveness of the oversized tubing use for the top tube and down tube. An alternative approach has been to increase the diameter of the head tubes and the associated steer tube bore. While the larger diameter head tube avoids the need to crimp the top and down tube, the approach can require nonstandard bearings and a nonstandard steer tube. Significantly, this approach can add undesired weight, which is directly contrary to the desires of the market.

SUMMARY OF THE INVENTION

There exists a continuing need to develop new configurations for the bicycle frames that deal with the stress experienced at the head tube while also providing other benefits. These other benefits can include: decreased frame or component weight, improved bicycle handling, decreased deflection of the head tube, better bracing of the head tube, the ability to accommodate oversized tubing, and use of a standard headset.

In some embodiments, a bicycle assembly can comprise a main frame comprising a top tube, a down tube and a head tube, wherein the top and down tubes are connected to the head tube. The head tube can include an internal bore having an internal bore surface, a front wall, a first ledge extending from a back wall and within the top tube, and a first surface proximate a top of the head tube. The bicycle assembly can further include a weld bead mating the head tube and top tube. The weld bead can sit on the first surface and a tubular outer surface of the top tube. The weld bead can be spaced from the bore.

In some embodiments, the bicycle assembly can further include certain other features. A second ledge can extend from the back wall and within the down tube. The back wall can have a thickness greater than the thickness of the front wall. The weld bead can be flush with the top of the head tube. The first surface can define a space for the weld bead to contact an end surface of the top tube.

In some embodiments, the first surface comprises a chamfer, and it may further include a second chamfer on a bottom of the head tube. Some embodiments of the bicycle assembly can further comprise a fork, a saddle, two wheels and/or a headset. The headset can be within the bore in the head tube and the weld bead can be spaced from the headset.

A bicycle assembly according to some embodiments can comprise a main frame comprising a top tube, a down tube and a head tube. The top and down tubes can be connected to the head tube. The head tube can include an internal bore having an internal bore surface, a front wall, a back wall having a thickness greater than the thickness of the front wall, and a first ledge extending from the back wall and within either the top tube or the down tube. In some embodiments, a top of the top tube can be connected to a top of the head tube and the back wall.

Further in some embodiments, the top of the head tube can include a chamfer and the top of the top tube is connected to the chamfer by a weld. The weld can be flush with a top planar surface of the top of the head tube. In some embodiments, the first ledge can extend within the top tube and a second ledge can extend from the back wall and within the down tube.

In some embodiments, a bicycle assembly comprises a main frame. The main frame can include a top tube, a down tube and a head tube, where the top and down tubes are connected to the head tube. The top tube can have a tubular outer wall, a tubular inner wall and an end surface. The head tube can have an internal bore having an internal bore surface, a front wall, a first ledge extending from a back wall, within the top tube and contacting the tubular inner wall and a first surface on a top of the head tube. In some embodiments of the bicycle assembly, a weld bead can mate the head tube and top tube, the weld bead sitting between the first surface and the first ledge on the head tube and the tubular outer wall of the top tube, the weld bead being flush with the top of the head tube and spaced from the bore.

A bicycle assembly can be manufactured via various methods. According to certain embodiments, a method of manufacturing a bicycle assembly can comprise one or more of the following steps. Providing a forging die containing at least a partial relieved form of a head tube. Providing a forging ram containing at a partial relieved form of said head tube. Providing a blank of roughly the external dimensions of said head tube. Utilizing said forging die and said forging ram to forge said blank into a work piece defining the external dimensions of the head tube. Creating an internal opening in said work piece that defines a first axis and is sized and shaped for receiving a bicycle steer tube therethrough.

In some embodiments, forging of said blank into said work piece and creating the internal opening can comprise forming a internal opening such that a thickness of the front of the head tube is less than the thickness of the back of the head tube along a horizontal plane from front to back.

The method may further include welding a top tube and a down tube to said head tube. According to some embodiments, welding can comprise welding a top of the top tube to a top of the head tube and a bottom of the down tube to a bottom of the head tube. According to some embodiments, welding can comprise flush welding at least a portion of the top of the top tube and the head tube. According to some embodiments, welding can comprise flush welding at least a portion of the bottom of the down tube and the head tube. According to some embodiments, welding can comprise all or some of the above welding method steps.

BRIEF DESCRIPTION OF THE DRAWINGS

These and other features, aspects and advantages are described below with reference to drawings of preferred embodiments, which are intended to illustrate but not to limit the present invention.

FIG. 9A is a cross-sectional view of an upper portion of the head tube, taken along line 9A-9A of FIG. 8. FIG. 9B is a cross-sectional view of a middle portion of the head tube, taken along line 9B-9B of FIG. 8. FIG. 9C is a cross-sectional view of a lower portion of the head tube, taken along line 9C-9C of FIG. 8.

DETAILED DESCRIPTION OF THE PREFERRED EMBODIMENT

Figure 1:
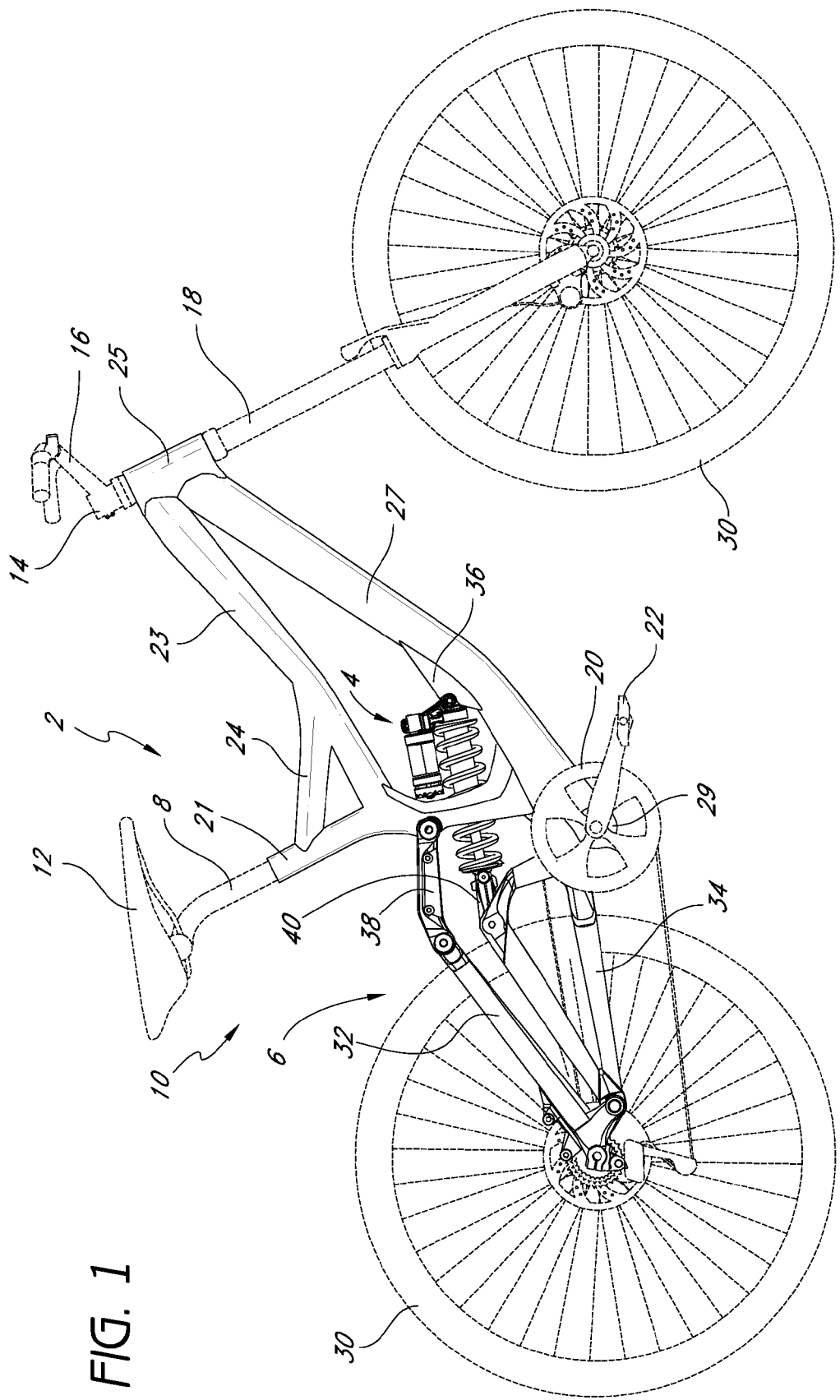
FIG. 1 is a side view of an embodiment of a bicycle frame.

A bicycle, as shown in FIG. 1, has a bicycle frame 10 that may include a rear suspension system. Although the bicycle frame described herein is preferred for use in connection with an off-road bicycle as described herein, one of skill in the art will appreciate that embodiments and components of the bicycle frame may be used in other suitable environments as well. The bicycle frame 10 shown is made-up of a main frame 2, a shock absorber 4 and a sub-frame 6. A main frame 2, according to some embodiments, has a seat tube 21, a top tube 23 and a head tube 25. The top tube 23 can connect the seat tube 21 and the head tube 25. A seat post 8 with an attached saddle 12 can be installed in the seat tube 21. A steering post or column 14 which connects the handle bars 16 and the fork 18 can be installed in the head tube 25. The fork can support the front wheel 30. Some embodiments may further include a down tube 27 and a bottom bracket 29. The down tube 27 can connect the bottom bracket 29 and the head tube 25. A crank 20 can be installed into the bottom bracket 29 to which pedals 22 can be attached.

According to some embodiments, the main frame 2 can further include one or more gussets or cross tubes 24. The cross tubes can connect various parts of the main frame 2. For example, in FIGS. 1-2, the cross tube 24 connects the seat tube 21 and the top tube 23. Cross tubes 24 can increase the frame's stability and allow for additional design features, such as a downward sloping top tube 23.

As mentioned, the bicycle frame 10 can also include a sub-frame 6 and a shock absorber 4. The sub-frame 6 is movable relative to the main frame 2. The shock absorber 4 regulates movement between the sub-frame 6 and the main frame 2.

The sub-frame 6 can include a pair of seat stays 32 and a pair of chain stays 34. Each seat stay 32 can connect with a corresponding chain stay 34 and can support a rear wheel 30. This connection can be fixed or pinned to allow for rotation. In some embodiments, the chain stays 34 are hingedly connected to the main frame at or near the bottom bracket 29.

A link 38 can also be used to connect the main frame 2 and sub-frame 6. In some embodiments, the link 38 is pivotally connected to the main frame 2 and sub-frame 6. In some embodiments, the link 38 can be attached to the shock absorber 4, instead of, or in addition to, either the main frame 2 or the sub-frame 6.

A forward end of the shock absorber 4 is shown rotatably coupled to the main frame 2 for a rotation about a pivot axis. This pivot axis can be defined by a shock mount 36. A rearward end of the shock absorber 4 is coupled to an extension body 40 which is rotatably coupled to the sub-frame 6 and, more specifically, to a shock mount assembly 42 for a rotation about a pivot axis. The shock absorber 4 can be used to control the amount of movement between the main frame 2 and the sub-frame 6 and the rate of change in their relationships.

The main frame 2 can be is constructed of individual components, as described above, which are fabricated from a metal material, such as aluminum, titanium, or steel, and welded or otherwise connected. The bottom bracket 29 can be created from a metal material by a forging process and, can thus, benefit from the strength and durability advantages that inherently result from the forging process. Further, other suitable constructions of the main frame 2, including non-triangular constructions, may also be used, such as a monocoque construction, for example. In addition, alternative materials such as composites may also be used in whole or in part to construct the main frame 2 and/or sub-frame 6, as will readily be appreciated by one of skill in the art.

As described above, the illustrated bicycle frame 10 includes a shock absorber 4 operably positioned between the main frame 2 and the sub-frame 6. Desirably, the shock absorber 4 is configured to provide both a spring force and a damping force in response to relative movement between the sub-frame 6 and the main frame 2, as is known in the art. The spring force is related to the relative position between the sub-frame 6 and the main frame 2 while the damping force is related to the relative speed of movement between the sub-frame 6 and the main frame 2.

Although the illustrated shock absorber 4 incorporates a coil type spring, other suitable suspension springs, such as air springs, for example, may also be used. The damping system may comprise a piston movable within a fluid cylinder of the shock absorber 4. The piston may force hydraulic fluid within the fluid chamber through one or more restrictive flow paths to generate a damping force when the shock absorber 4 is both extending and compressing, as is known in the art. In addition, other types of damping arrangements, such as inertia activated and position sensitive arrangements, may also be used, as well be readily understood by one of skilled in the art.

Figure 2:
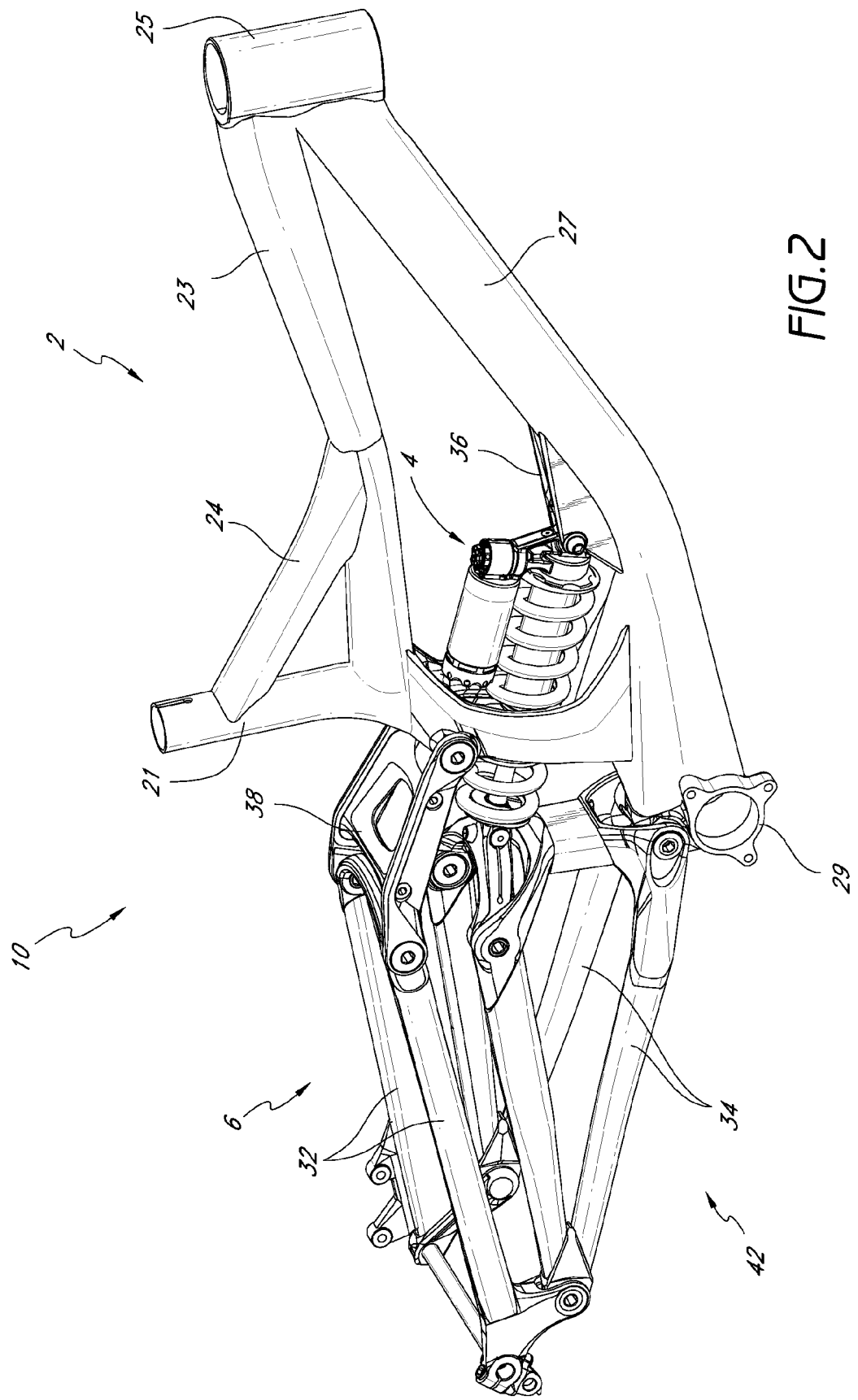
FIG. 2 illustrates a perspective view of the bicycle frame of FIG. 1.

As described above, the sub-frame 6 is configured to support the rear wheel 30 (FIG. 1) for a movement throughout a suspension travel path relative to the main frame 2 from a relaxed position, substantially as illustrated in FIG. 2, to a compressed position, wherein the sub-frame 6 is pivoted in an upward direction relative to the main frame 2. Preferably, the sub-frame 6 is a multiple linkage assembly. That is, preferably, the sub-frame 6 includes a plurality of linkage members pivotally interconnected with one another. However, in alternative arrangements, a single link member may carry the rear wheel 30 for movement in a simple, arcuate suspension travel path relative to the main frame 2.

Though one configuration of a bicycle frame 10 is shown, those skilled in the art understand that various configurations are possible and may also be desirable.

The Head Tube

The head tube 25 is described in greater detail with reference to FIGS. 3-9C. The head tube 25 rotatably secures the steer tube 14 (illustrated in phantom in FIG. 5) within an opening 70 of the head tube 25. The opening 70 extends lengthwise through the head tube 25 and, preferably, defines the steering axis $A_S$ (FIG. 5).

Figure 3:
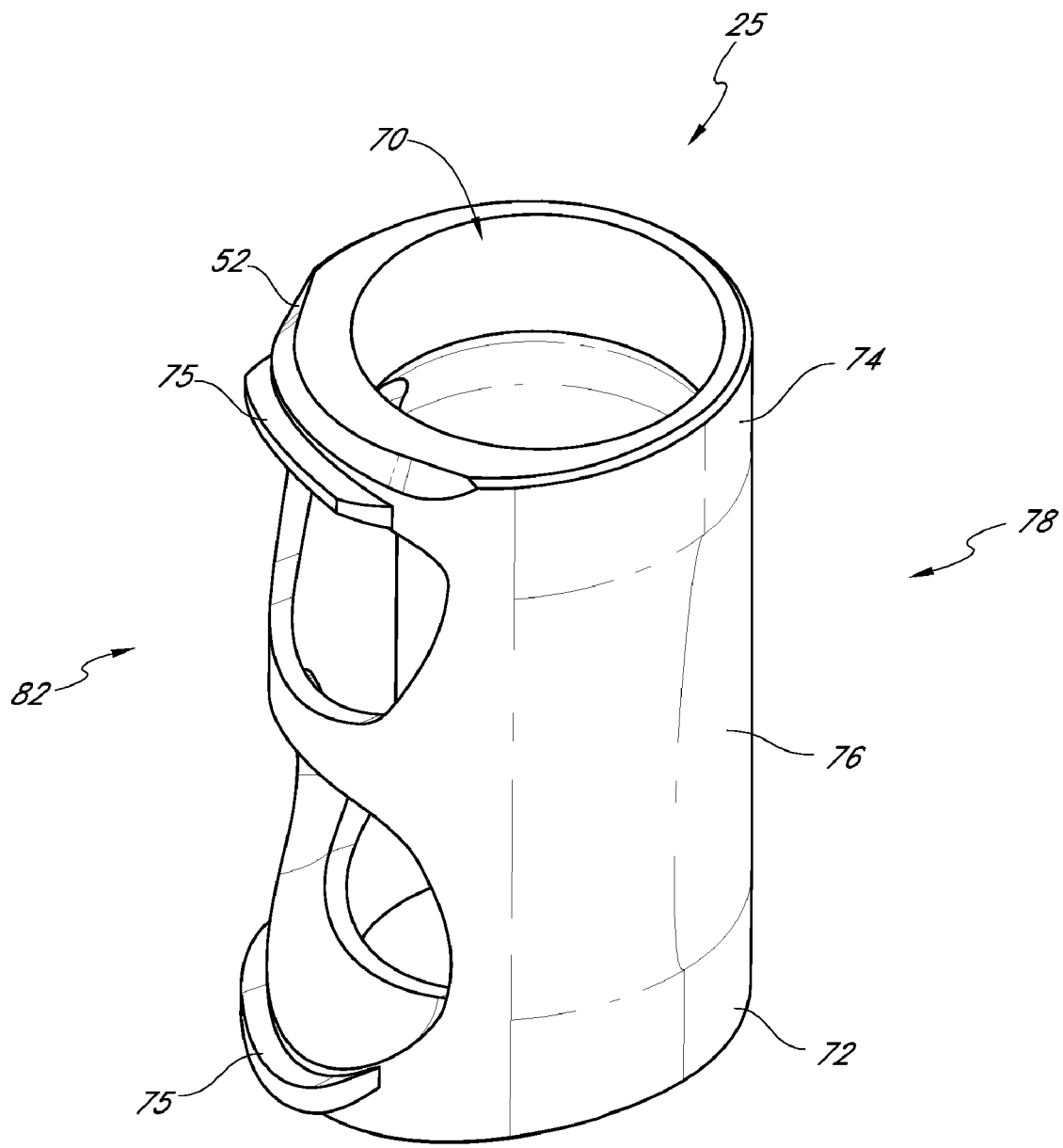
FIG. 3 is a perspective view of an embodiment of a head tube.
Figure 4:
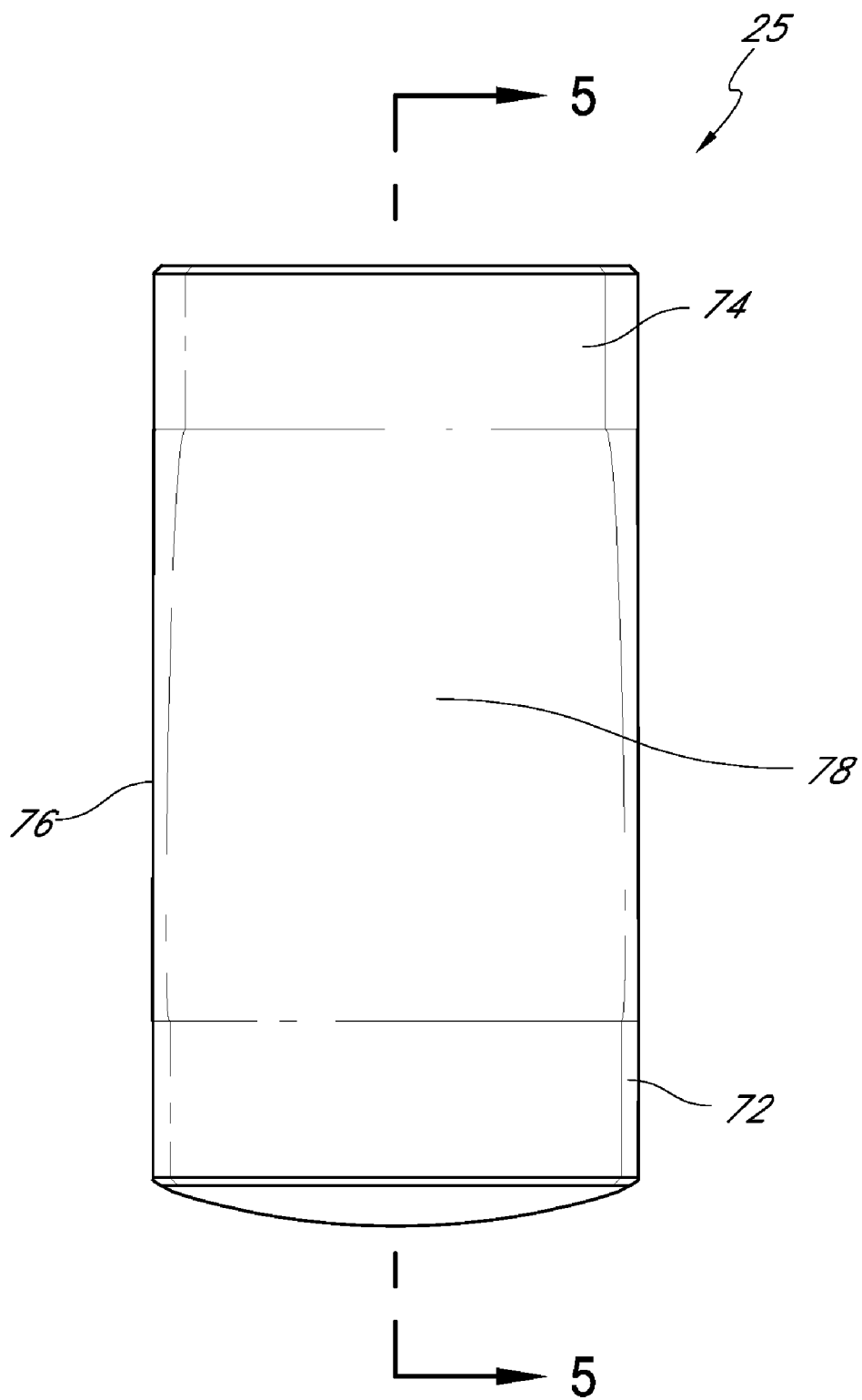
FIG. 4 is a frontal view of the head tube of FIG. 3.
Figure 5:
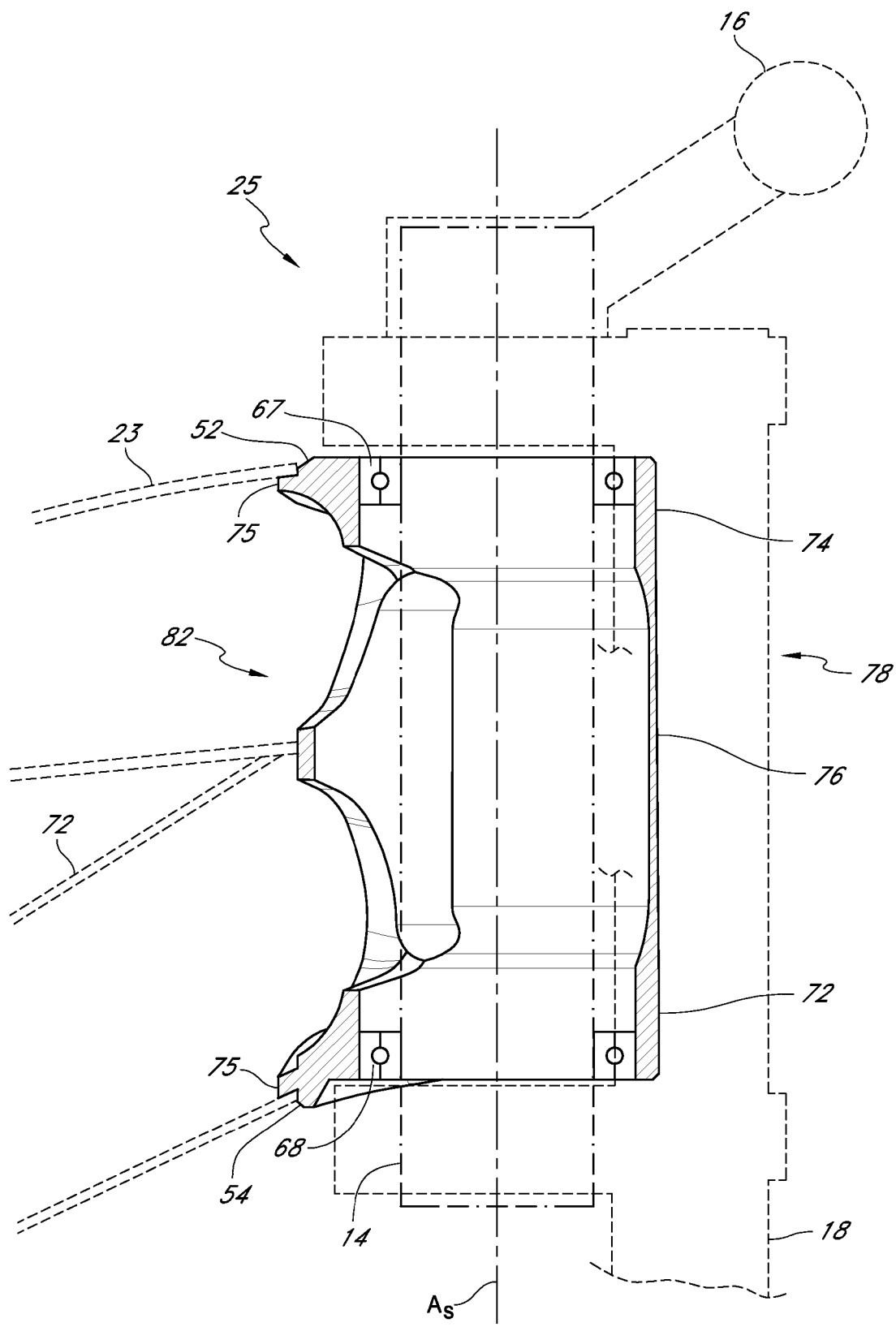
FIG. 5 is a cross-sectional view of the head tube of FIGS. 3 and 4, taken along the line 5-5 of FIG. 4. A front suspension fork assembly, handlebar assembly and a steer tube of the bicycle are shown in phantom.

With reference in particular to FIGS. 3 and 5, a lower reinforced wall portion 72 of the head tube 25 preferably is disposed at a lower end of head tube 25, nearest the front suspension fork assembly 18, and an upper reinforced wall portion 74 preferably is disposed at an upper end of the head tube 25, near the handle bar assembly 16. As illustrated in FIG. 5, the steer tube 14 interconnects the handlebar assembly 16 and the front suspension fork assembly 18. A headset assembly can include upper and lower bearings 67, 68 (shown schematically in FIG. 5), which support the steer tube 14 relative to the head tube 25. The headset assembly can be integrated, semi-integrated, internal, conventional or other configuration. The headset can be a 1.125 inch or 1.5 inch nominal diameter headset or different sized headset. In some embodiments, the headset assembly can include upper and lower headset "cups", which are press fit into the head tube 25 and define bearing surfaces, or races, for the bearings 67, 68. The reinforced portions 72, 74 reinforce and provide additional support for standard size bearing races (not shown) of the headset assembly (not shown). As shown, the reinforced portions can be integrally formed areas of the head tube 25 which are thicker than areas adjacent thereto. In some embodiments, the head tube 25 can have different sizes lower and upper portions to accommodate a tapered steer tube.

The reinforced portions 72, 74 can each comprise an essentially annular ring at an end of the head tube 25. These reinforced portions 72, 74 desirably have a thickness greater than the average wall thickness of a middle portion 76 of the head tube 25. Furthermore, the lower reinforced wall portion 72 can be thicker, and/or contain more material in certain locations, than the upper reinforced wall portion 74 as the lower portion 72 is subjected to more force than the upper portion 72. The force acting on the lower portion 74 originates primarily from the front fork 18 (due to impact forces applied to the front wheel 30), which has a relatively long moment arm (measured from the front wheel 30 to the lower bearing 68). In contrast, the upper reinforced portion is subjected primarily to force originating from the handle bar assembly 16, which has a relatively smaller moment arm (measured from the handlebar assembly 16 to the upper bearing 67).

The head tube 25 is subjected to very strong forces acting generally in the fore and aft directions. As described above, the fork 18 acts as a long lever arm on the head tube 25 and amplifies forces experienced by the front wheel 30. Over time, the lower end (the area generally analogous to the reinforced portion 72) of a conventional head tube may ovalize as a result of being subjected to cyclic fore and aft forces. To ovalize in terms of head tube technology means to deform from a round geometry to an oblong geometry due to forces subjected in a single plane. Thus, in the present situation a conventional head tube tends to ovalize such an opening of the lower portion of the head tube becomes oblong, with the longer axis extending in a fore-aft direction, or along the length of the bicycle. The use of a larger nominal headset diameter, such as 1.5 inch instead of 1.125 inch can reduce the propensity to distort. The reinforced portions 72, 74 can further add strength to resist the damaging effects of the described planar forces, which are amplified by the moment arm of the fork 18 and wheel 30 combination.

In some embodiments, the reinforced portions 72, 74 can be formed by configuring the middle portion 76 of the head tube 25 such that an outer surface thereof forms a depression between the two reinforced areas 72 and 74. The front middle portion of the head tube is subjected to little stress when compared to the upper and lower reinforced portions 72, 74. Desirably, the wall thickness of the head tube 25 in this area 76 is reduced, which results in a recessed surface on either or both of the inner or outer surface between the upper and lower reinforcing portions, 74 and 72. The thickness of the upper and lower reinforcing portions, 74 and 72 can be the same or different. For example, the lower reinforcing portion 72 can be thicker than the upper 74. In some embodiments, the lower reinforcing portion 72 can be about less than or more than 1 mm thicker than the upper reinforcing portion 74. This can add more strength to a higher stress area.

Figure 6:
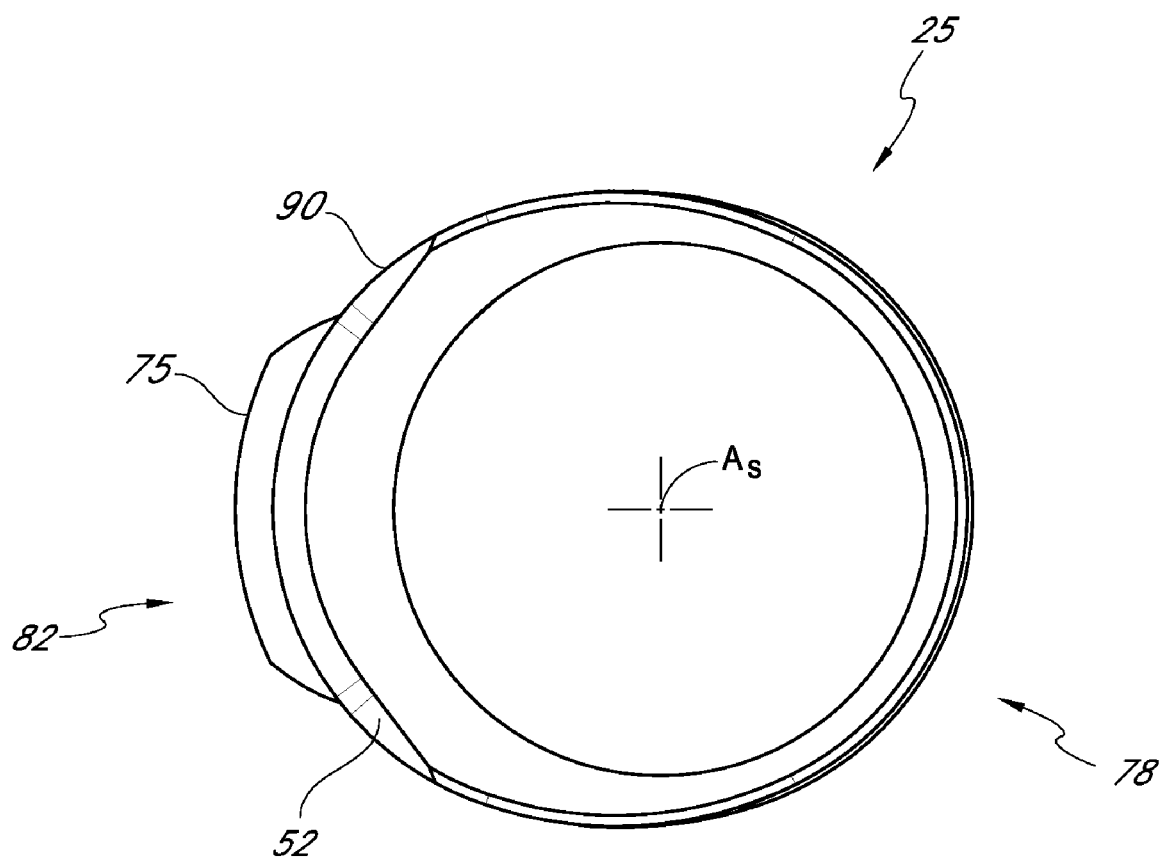
FIG. 6 is a top view of the head tube of FIG. 3.

Looking to FIG. 6, it can be seen that the front side 78 of the head tube 25 is not symmetrical to the back side 82 of the head tube, and in fact the back side 82 is thicker than the front side 78. Therefore, the illustrated head tube 25 preferably is not symmetrically designed, about a lateral axis passing through the steering axis $A_S$. In addition, material can be removed from the middle portion 76 of the back side 82 so that it has a reduced wall thickness, as discussed above. It would be simpler to manufacture a head tube that was symmetrical front to back, but doing so would add mass and weight, or in the alternative, would result in a weaker head tube 25 susceptible to ovalization if weight is reduced all around.

To reduce the weight of the reinforced head tube 25, the head tube preferably has a lower wall thickness or less material in areas that experience less stress under normal operating circumstances. A head tube reinforced without consideration of non-critical and critical stress areas would have considerably more mass, and weigh considerably more, than the illustrated head tube 25 made from the same material.

At the same time, it was previously believed that the front side of a head tube used with oversized top and down tubes should be thicker than the back side of the head tube. It was thought that this was the case because the back side was reinforced by the remainder of the main frame (e.g., the top and down tubes). As will be shown in more detail below, it has been found that a main frame 10 having a head tube 25, as described herein, with a thicker back side 82 than the front side 78 has greater ultimate and fatigue strength than other main frames having a head tube with a thicker front side than the back side.

Referring still to FIG. 6, the back side 82 of the head tube 25 can form a continuous curved surface 90 for receiving the attachment of the top tube 23 and down tube 27 of the main frame 10. In some embodiments, the continuous curved surface 90 can have an oval shape or alternatively an elliptical shape. The both the front side 78 and the back side 82 of the shape of the curved surface 90 can have radii with a center point either aligned or offset from the central axis (steering axis $A_S$) of the opening 70. In addition the radii can be the same or different. In addition the radius of the sides of the shape can be the same or different from either the radii of the front and back side.

In some embodiments, the curved surface 90 on the back side has a constant radius, top to bottom. This can simplify the mitering of the top tube 23 and the down tube 27. The curved surface 90 of the front side 78 can be a complex surface that, for example, mates a smaller outer diameter of the top front portion to a larger outer diameter of the bottom front portion, such as where the lower reinforcing portion 72 is thicker than the upper reinforcing portion 74, as discussed above. Preferably, a forging process can be used to form random or complex surfaces.

The continuous curved surface 90 on the backside 82 of the head tube 25 allows the top tube 23 and down tube 27 to be cut, or mitered, with a simple circular cut, that will provide an efficient matching surface on the top tube 23 and down tube 27 for attaching to the head tube 25. Desirably, the circular cut in the top tube 23 or down tube 27 has a radius within about 0.01 inches of the radius of the backside 82 of the curved surface 90 of the head tube 25. More desirably, the radius of the circular cut in the top tube 23 or down tube 27 has a radius that is the same as the radius of the backside 82.

By providing a head tube 25 that will receive a simply, or circular cut top tube 23 and down tube 27, tubes of varying and exotic cross sectional profiles can be used easily, without the concern associated with filling gaps created by poorly cut weld surfaces, which often result in non-circular cuts. Such an arrangement simplifies manufacturing in comparison to other methods for producing a reinforced head tube, which may require non-circular miter cuts in the top and down tubes. For example, in a head tube having an outer surface thereof oval in shape to increase the wall thickness in the forward and rearward sides, the miter cut in the top and down tubes preferably are also oval in shape, which cannot be accomplished by a standard drilling operation. Instead, a more complex method must be used to create the miter cuts in the top tube and down tube, which typically both increases costs and reduces accuracy. As described above, a precise fit between the outer surface of the head tube and the cut surfaces of the top and down tubes is highly beneficial in providing a strong welded joint.

With reference to FIGS. 3, 5-8 and 9A-9C, additional features of the back portion 82 of the head tube can be seen. A pair of ledges or protrusions 75 can extend from the back side 82 of the upper and lower reinforcing portions 74 and 72 of the head tube 25. Preferably, the ledges 75 extend a short distance and are configured to fit within the respective top tube 23 and down tube 27. The ledges 75 can be configured to precisely position the top and/or down tube 23, 27 along the head tube 25. For example, the inside surface of the top tube 23 can sit against the ledge 75 and the end surface of the top tube 23 can abut the surface 90 of the backside 82 of the head tube 25. In this way the top tube 23 can be precisely located along the backside 82 of the head tube 25.

A surface, such as a chamfer, 52, 54 can be included on the top and bottom of the backside 82 of the head tube 25. As shown, the chamfer 52 at the top of the head tube 25 is larger than the chamfer 54 at the bottom of the head tube. Other configurations are also possible. The ledges 75 and chamfers 52, 54 can be used to facilitate the connection of the top tube 23 and the down tube 27 to the head tube 25. Further, as the back portion 82 has more material than the front portion 78, the back portion 82 can be contoured to increase strength while removing unnecessary material to reduce weight. In addition, the back portion 82 can be configured to facilitate attachment of the top tube 23 and the down tube 27 to the head tube 25.

The head tube 25, as described herein, can be shorter than conventional head tubes. For example, the top of the top tube 23 and the bottom of the down tube 27 can be flush with the top and bottom of the head tube 25, respectively. This provides better bracing, lower weight, and a stronger assembly then conventional head tubes which have a space 96 between the top and bottom of the head tube 25' and the connecting top and down tubes 23', 27' (See FIG. 10). Even though the head tube 25 is shorter than conventional head tubes, by allowing the top and bottom tubes 23, 27 to be flush with the top and bottom of the head tube 25, respectively, the top of the top tube 23 and the bottom of the down tube 27 can actually be farther apart than on a corresponding conventional head tube. This improves the bracing of the head tube 25; the improved bracing and increased strength allow the main frame 10 to better deal with the stress experienced by the head tube, as discussed previously.

On a standard head tube assembly, the top tube 23' meets the head tube 25' at a generally right angle. The weld on the top of the top tube 23' is laid in this right angle, in the space 96. In the preferred embodiment of the head tube 25, as described herein, the right angle at the top of the top tube 23 does not exist. The ledge 75 and the thickness of the backside 82 of the head tube 25 desirably allows the weld bead to be laid on the top of the top tube 23 and the top of the head tube 25, as well as the bottom of the down tube 27 and the bottom of the head tube 25, and in both cases not interfere with the headset bore, or opening 70. Both the ledges 75 and the backside 82 wall thickness desirably allow for "top" welding or "flush" welding, which facilitate shorter head tubes. Some embodiments may include a chamfer 52, 54 on either or both of the top and bottom of the head tube 25. The chamfer 52, 54 can also be used to facilitate "top" welding and shorter head tubes.

In some embodiments, the bottom of the down tube 27 can be connected to the head tube 25 below the bottom of the head tube. This can be due to a downward extending flange on the head tube. This configuration can be best suited to frame designs using a double triple clamp fork. A single crown fork can theoretically rotate 360 degrees, and the down tube for such a fork can be configured to be flush with the bottom of the head tube, or the frame can be otherwise modified to allow the fork to rotate with contacting the down tube.

To further reduce weight, holes 44, 46 can be provided in the back side 82 of the head tube 25 as material inside of the top and down tubes 23, 27 is unnecessary. Preferably, the holes 44, 46 extend through the wall of the head tube 25 and intersect the opening 70.

The holes 44, 46 may be of any suitable shape within the confines of the periphery of the top tube 23 and down tube 27, respectively. In conventional head tubes, the weight reducing holes (comparable to holes 44, 46) are circular in shape because circular holes are easier and cheaper to produce. However, to maximize the weight reduction, the holes 100, 102 are preferably shaped and sized to approximate the inner profile of the top tube 23 and the down tube 27 to enable the most material to be removed from the head tube 25. In order to obtain a desirable strength and stiffness to weight ratio, the top tube 23 and down tube 27 may be manipulated, or shaped, into a non-circular cross-sectional shape.

Weight reducing holes that approximate the shape of such exotically shaped tubing are more difficult to produce than round holes in a conventional head tube. However, with the head tube 25 produced by a preferred process as described herein, the holes 44, 46 may be easily, and inexpensively, produced in a large variety of complex shapes to correspond with the shape of the top tube 23 and down tube 27. Because depressions (which later form the holes 44, 46) are initially produced by a forging die and/or ram, they may take on complex shapes without the additional cost associated with producing complex shaped holes by a standard machining process. The depressions that form the holes 44, 46 are created to a depth, from an outer surface of the head tube 25, such that the depressions are intersected by the opening 70. Thus, the depressions intersect with the opening 70 to create the holes 44, 46. Accordingly, the holes 44, 46 may assume complex shapes, but still be manufactured in an efficient and relatively inexpensive manner in comparison to convention head tubes. A preferred process for creating the openings 44, 46 by a forging process is described in greater detail below with reference to FIGS. 11-14.

Figure 8:
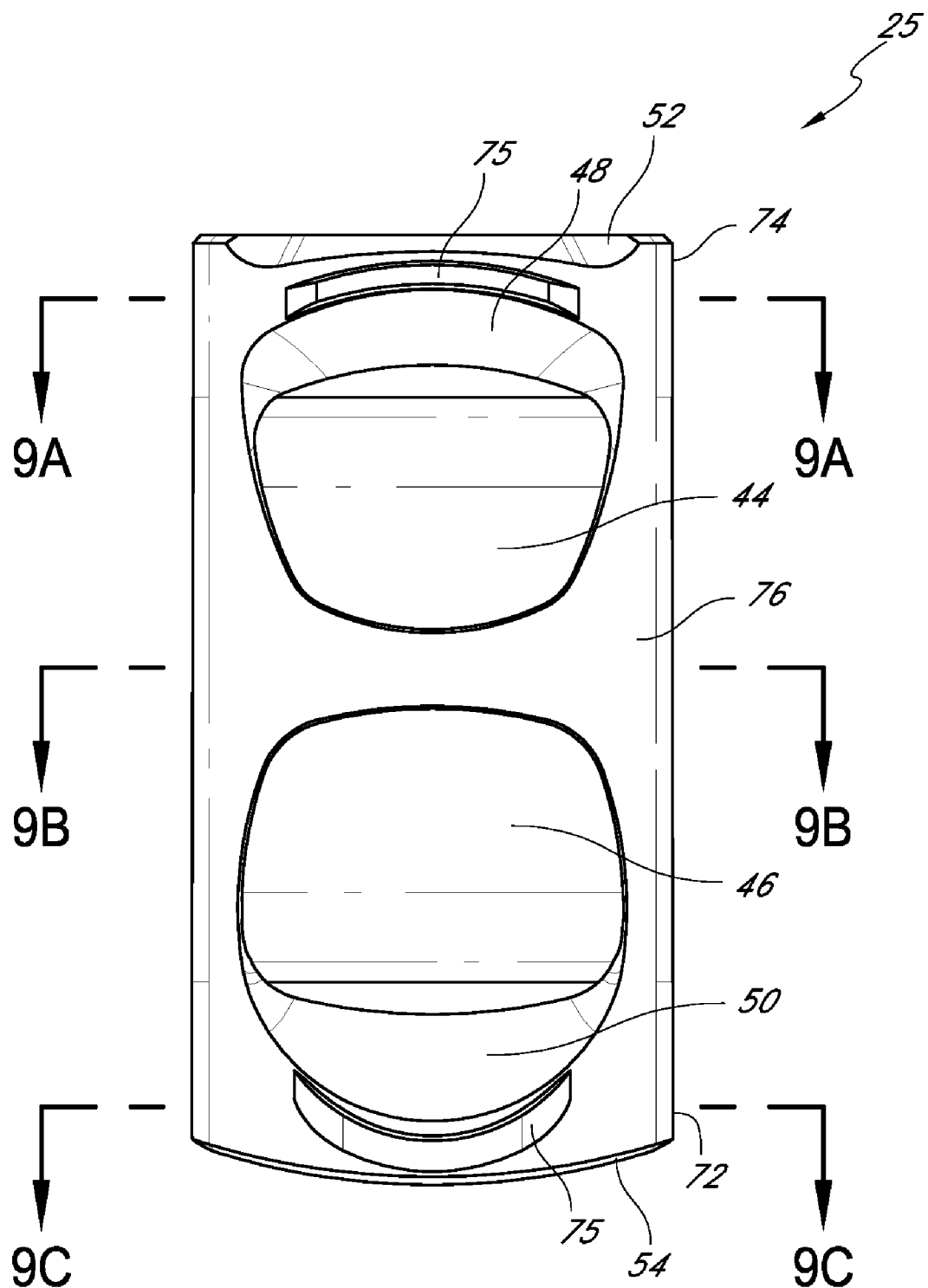
FIG. 8 is a rear view of the head tube of FIG. 3.

As can be seen, in particular in FIGS. 5 and 8, the holes 44, 46 may include material 48, 50 that remains inside the inner profile of the top 23 and down 27 tubes, respectively. This material can be contoured and configured to reduce weight and yet increase strength.

Figure 9A:
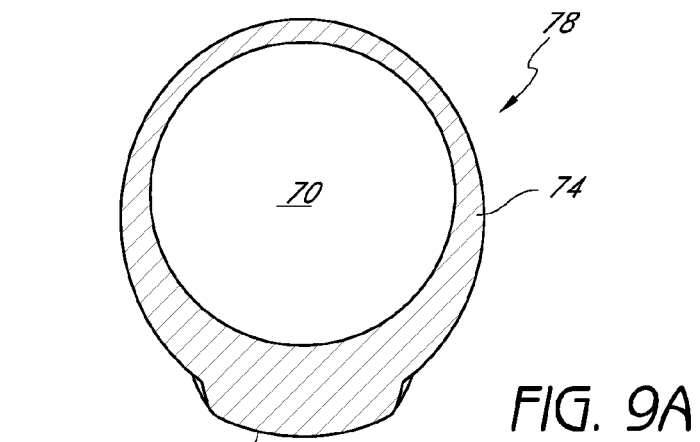
FIGS. 9A-9C are cross-sectional views of the head tube of FIG. 3.

FIG. 9A is a cross-sectional view of the head tube 25 near the upper end, or upper reinforced portion 74, of the head tube 25. This view illustrates the difference in thickness between the front side 78 and the back side 82 where a front side 78 of the upper end 74 defines an average wall thickness, and a back side 82 of the upper end 74 defines another average wall thickness.

Figure 9B:
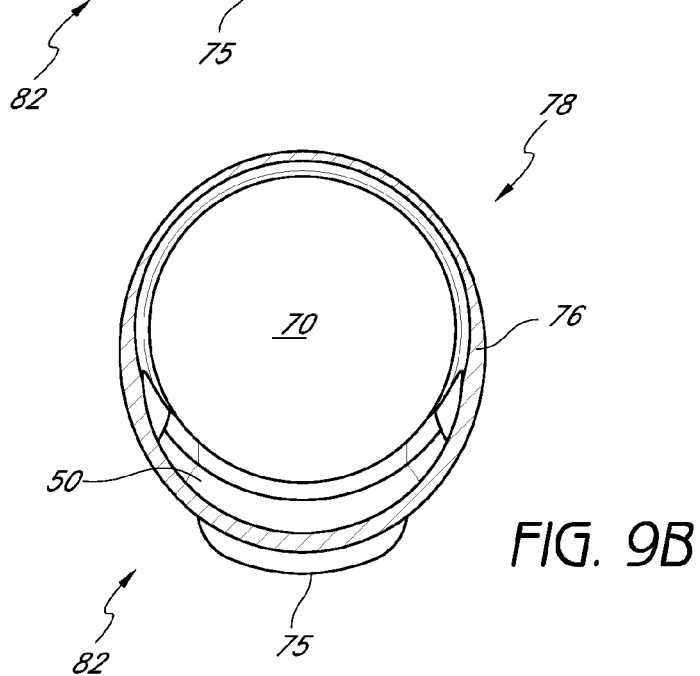

FIG. 9B is a cross-sectional view of the head tube 25 at the middle portion 76. This view illustrates the continuous curve of the surface 90 at the back side 82 of the head tube 25. The middle portion 76 also defines an average wall thickness. Furthermore, each of the front portion 78 and rear portion 82 define an average wall thickness.

Figure 9C:
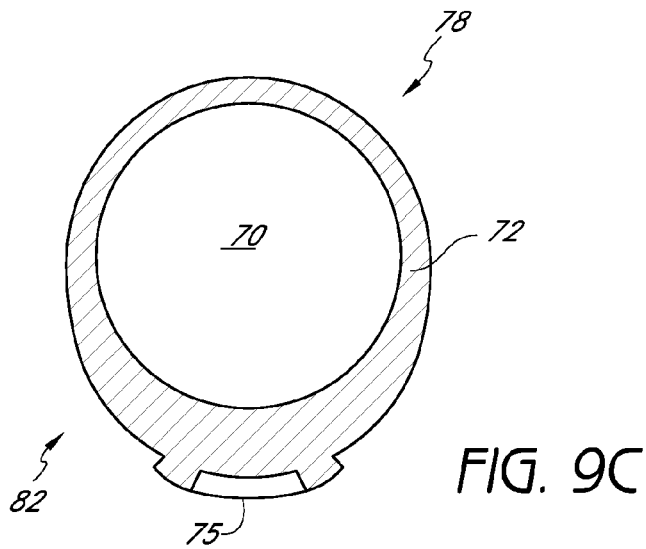

FIG. 9C is a cross-sectional view of the head tube 25 near the lower end, or lower reinforced portion 72. The lower end 72 defines an average wall thickness and each of front and rear portions 78, 82 define an average wall thickness.

FIGS. 9A through 9C illustrate the varying wall thickness construction of the head tube 25, as discussed in detail above. For example, comparing the average wall thicknesses of the head tube 25 in FIGS. 9A and 9C with the wall thickness in FIG. 9B clearly illustrates the preferred construction of a greater average wall thickness in the upper and lower portions 74, 72 of the head tube 25 in comparison to the average wall thickness of the middle portion 76. Such a construction provides increased strength and durability to the upper and lower portions 74, 72 of the head tube 25, where stresses are higher, and reduces material in the middle portion 78 of the head tube, where the stresses are lower. In addition, preferably, the average wall thickness of the lower portion 72 is greater than an average thickness of the upper portion 74, due to the higher stresses in the lower portion 72 resulting from the added leverage of the front fork assembly 20, as described in detail above. As shown, the average wall thickness of the lower portion 72 is only slightly larger than the average wall thickness of the upper portion 74. On other embodiments, the difference can be more pronounced.

Furthermore, FIG. 9C clearly illustrates the preferred variation in wall thickness within at least the lower portion 72 of the head tube 25, wherein the back side 82 has a greater average wall thickness than the front side 78. Accordingly, the preferred head tube 25 advantageously optimizes both strength and weight. Similarly, the upper and middle portions 74, 76 may have a differing average wall thickness between the front portion 84 and the back portion 86 to optimize the strength-to-weight ratio of the entire length of the head tube 25.

An embodiment of a method for manufacturing a head tube 25 of complex shape and including complex shaped holes, is described with reference to FIGS. 11-14. Step S1 involves providing a forging die. Preferably, a surface of the die comprises relieved features that are intended to be impressed on to the head tube 25 during the forging process. For example, the structure that provides the outer shape of the front side 78 of the head tube 25 will be relieved into the die and will be impressed into a forging blank 120, shown in FIG. 12. Thus, the die preferably includes desired features reversed and relieved on the surface. The die is preferably made of a material that is harder than the material of the head tube 25, or forging blank 120, at the working temperatures during the forging process. Because the die is of harder, features on the surface of the die will be impressed into the softer blank 120.

Step S2 involves providing a forging ram. Preferably, a surface of the ram comprises relieved features that are intended to be impressed on to the head tube 25. For example, the structure that provides the complex shaped holes 44, 46 and the ledges 75 is relieved into the ram face and will be impressed into the forging blank 120. Thus, the ram preferably includes the desired features reversed and relieved on its surface. The ram is preferably made of a material which is harder then the material of the head tube 25, or forging blank 120, at the working temperatures during the forging process.

Step S3 involves forming the blank 120 that will be used in the forging process. The blank 120 is desirably generally close to the mass of the final head tube 25 and, preferably, roughly the same mass as the final head tube plus the mass removed to form the opening 70. It will be appreciated that "roughly the same mass" includes a blank having greater mass than the final head tube 25 and creating excess material, or flash, between the die and ram. Thus, additional process steps may be included to remove any flash from the blank 120, such as the use of a cutting die, machining or grinding, for example.

Preferably, however, the blank 120 is similar in dimension to the finished head tube to reduce the force needed in the forging process. The blank 120 preferably is also roughly the same length as the final head tube 25. For example, if the finished head tube 25 is 112 mm in length, for a 1.5 inch nominal diameter headset, the blank 120 should be formed to a similar length that accounts for expansion lengthwise during the forging process. The blank 120 also should be roughly the width and thickness of the final head tube. For example, if the head tube 25 is 50 mm thick and 65 mm wide, the blank 120 should be roughly the those dimensions, accounting for mass displacement. In some embodiments, the head tube is between about 90-170 mm tall. The head tube can be configured to receive any number of headset sizes, including 1.5 inch and 1.125 inch nominal diameter and can be sized accordingly.

In one embodiment, a casting 120 (FIG. 12) is preferably used which approximates the finished shape of the head tube 25. In another embodiment, preferably bar stock of appropriate dimensions can be cut to the approximate length of the final head tube 25 and used in the forging.

Figure 7:
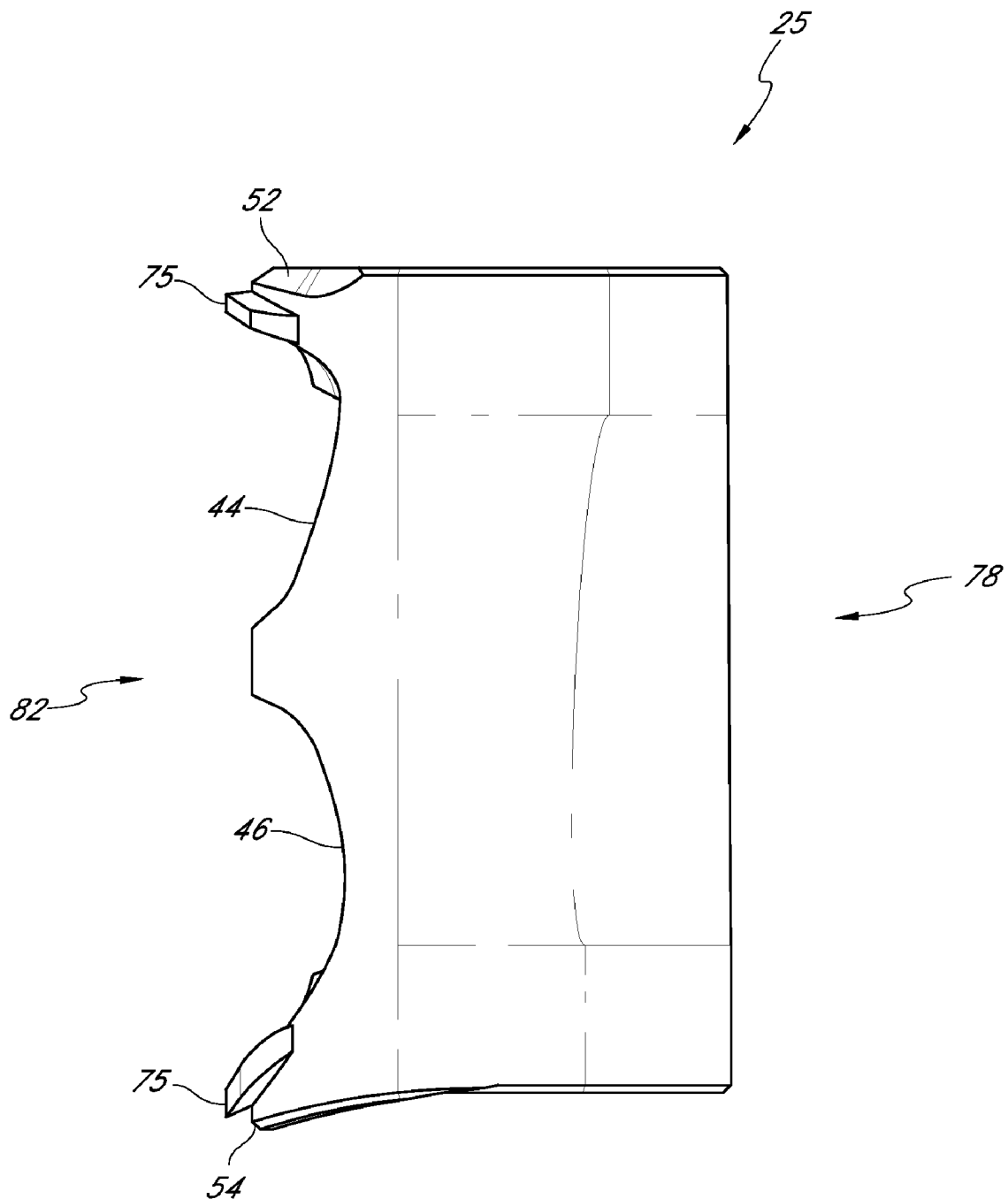
FIG. 7 is an elevational view of a right side of the head tube of FIG. 3.
Figure 13:
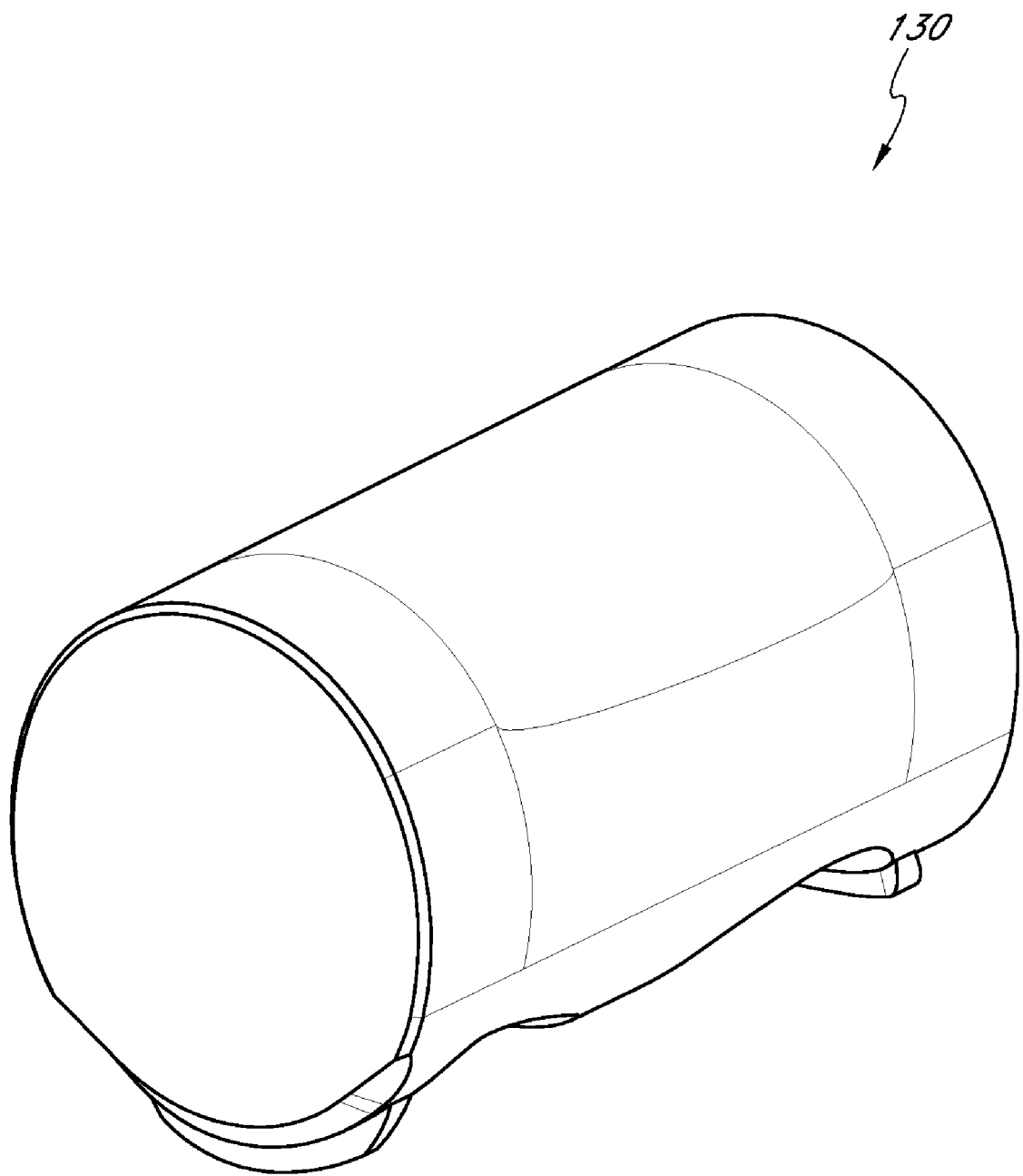
FIG. 13 is a perspective view of a work piece formed from the forging blank of FIG. 12 by a forging process.
Figure 14:
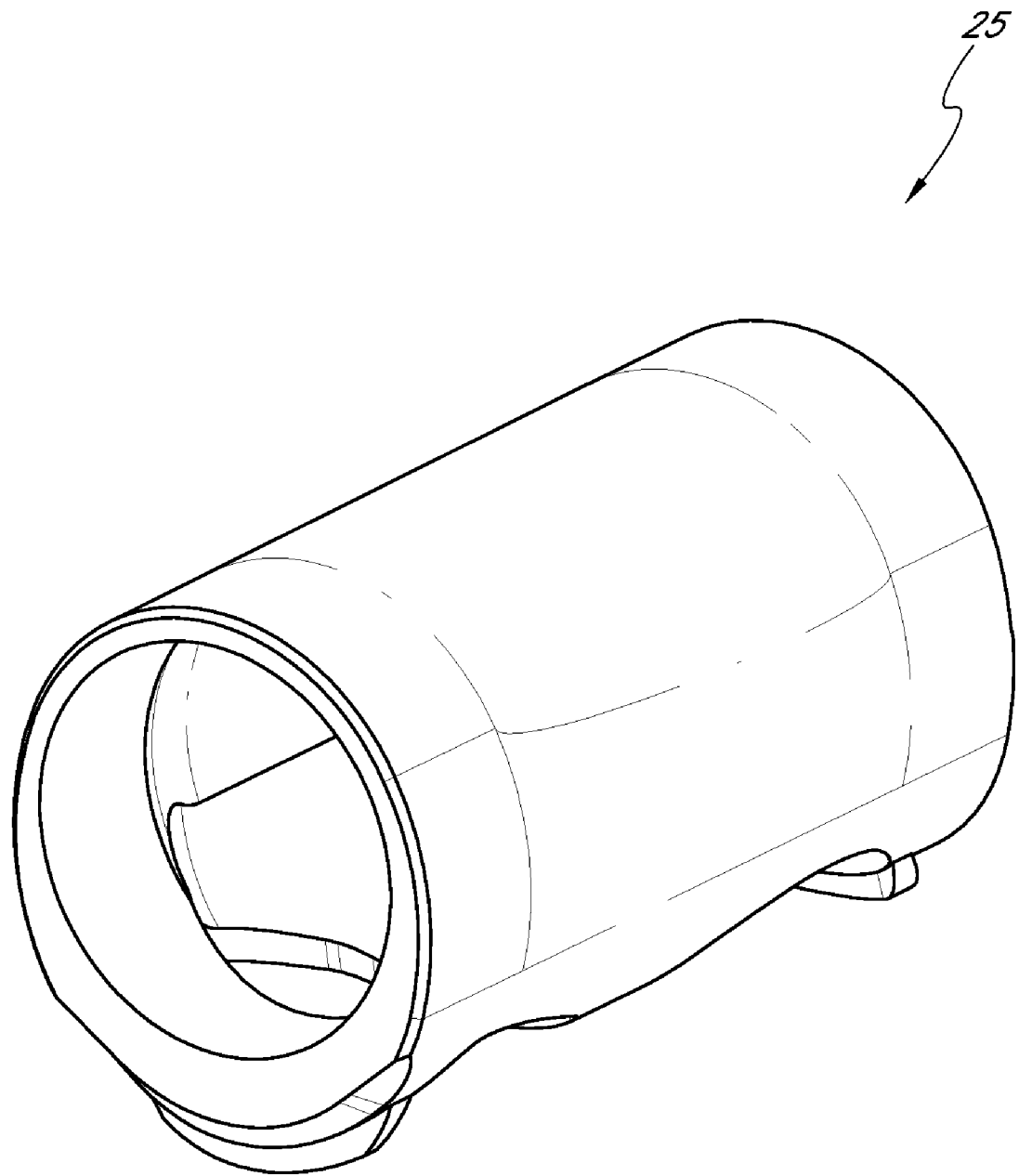
FIG. 14 is a perspective view of the completed forged head tube formed from the work piece of FIG. 13.

Step S4 involves forging the blank 120. A ram (preferably as described above) presses the blank 120 in to a die (preferably as described above) and forces the blank 120 material to conform to the shape of the die and ram face resulting in a partially processed head tube 25, or work piece 130 (FIG. 13). Both the die and the ram hold relieved features to forge into the blank 120. The die or ram can forge complex indentations into the blank 120, such as the non-round indentations needed for producing complex shaped holes 44, 46 on the back side 82 of the head tube 25 (FIGS. 7 and 8). After the forging process, the blank 120 preferably has the external dimensions of the finished head tube 25.

Step S5 involves creating the opening 70. An opening 70 is cut through the work piece 130 length wise (along the steering axis $A_S$) for receiving the steer tube 14 of the front suspension fork 18. Any features forged into the work piece 130 with a depth great enough to extend into the volume of material removed by the creation of the opening 70 will produce an additional opening that intersects with the opening 70. For example, the weight reducing holes 44, 46 on the back side 82 of the head tube 25 are preferably formed by the creation of the opening 70 intersecting the depressions corresponding to the holes 44, 46 made by the forging process. Desirably, once the opening 70 is created, the work piece 130 is essentially in the final form of the head tube 25. Creating the opening 70 can include various process steps. One example includes, rough drilling the opening, followed by milling to reduce weight and reaming the area where the head set presses in, such as at the upper and lower portions 74, 72. The step of milling can be performed with a CNC machine. In some embodiments, the opening 70 can be widened by milling, such as in the middle area 76 or the middle of the back side 82 to reduce any unnecessary material and reduce weight.

Although it is preferred that the process steps S1-S5 are performed in the above-described order to produce a head tube 25, the process steps may be completed in an alternative order and still provide advantages over conventional processes for producing head tubes. Furthermore, not all of the steps are necessarily required and additional process steps may be added. For example, as described above, if flash is present on the blank, or work piece, additional process steps may be utilized to remove the flash. Other additional process steps may also be included, as will be appreciated by one of skill in the art. Additionally, though a forging process has been described, the head tube can also be formed by other methods. For example, the head tube can be formed from sheet metal using a sheet metal forming process. In some embodiments the process can include various process steps, including bending and stamping. Other materials and/or processes can also be used.

Figure 15:
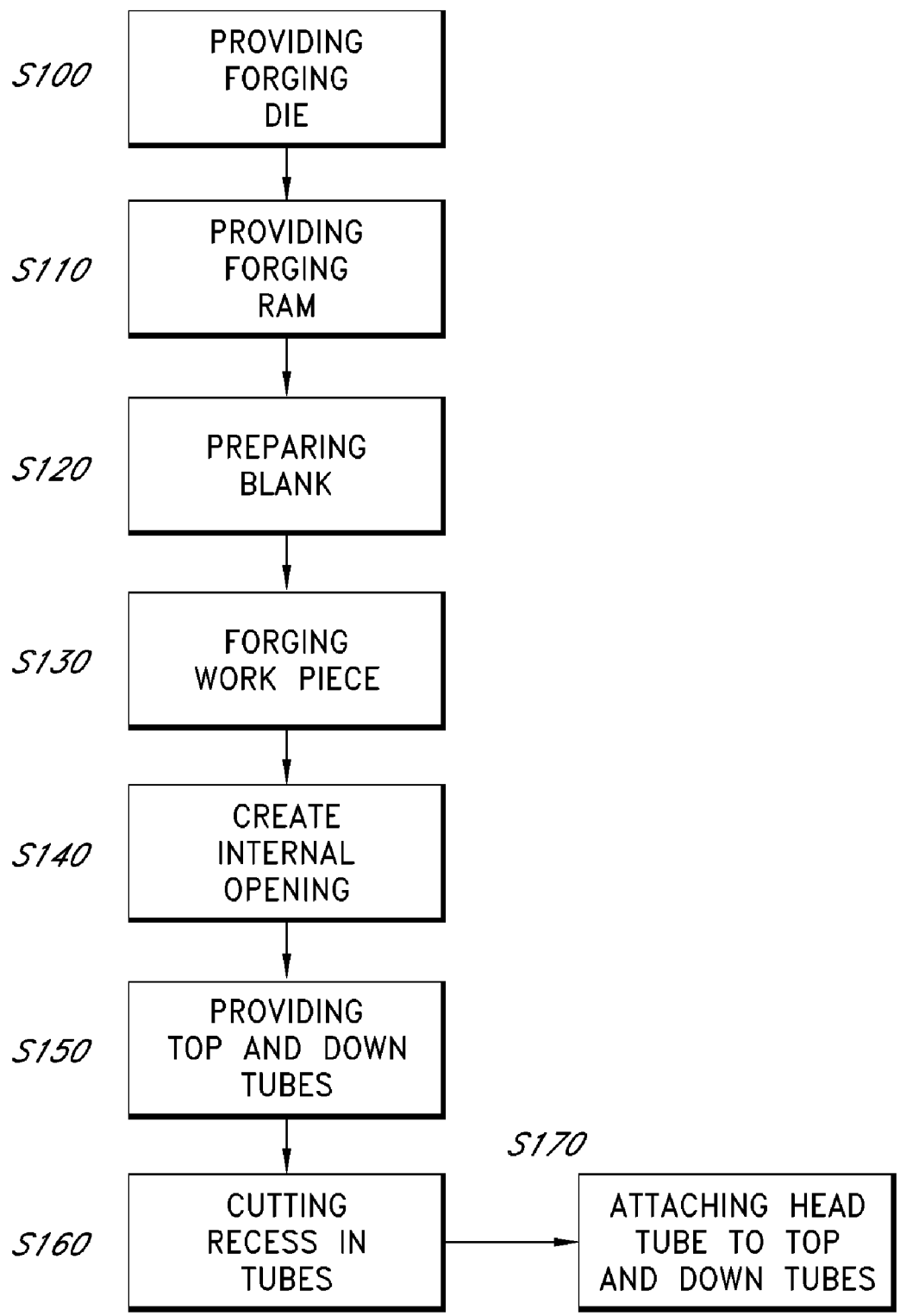
FIG. 15 is a flow chart of a manufacturing method for producing a junction between the head tube and the top and down tubes.

With reference to FIGS. 15-21 the junction 200 formed by the head tube 25, top tube 23 and bottom tube 27 is described in greater detail. FIG. 15 is a flow chart showing a method for manufacturing a head tube junction 200.

Step S100 involves providing a forging die (not shown). Preferably the die comprises relieved features that are intended to be impressed on to the head tube 25. For example, the structure that provides the outer shape of the front side 78 of the head tube 25 is relieved into the die and will be impressed into a forging blank, such as the blank 120 of FIG. 12. The die contains the desired features reversed and relieved on the surface. The die is preferably made of a material which is harder then the material the head tube 25 is made of at the working temperatures during the forging process. Because the die is of harder material, features on its surface will be impressed into the softer material of the blank 120.

Step S110 involves providing a forging ram (not shown). Preferably, the ram comprises relieved features that are intended to be impressed on to the head tube 25. For example, the structure that provides the complex shaped holes 44, 46 and the ledges 75 is relieved into the ram face and will be impressed into the forging blank 120. The ram contains the desired features reversed and relieved on its surface. The ram is preferably made of a material which is harder than the material the head tube 25 at the working temperatures of the forging process.

Step S120 involves forming the blank 120 used in a forging process to produce the head tube 25. The blank 120 is preferably roughly the same mass as the final head tube 25 plus the mass removed to form the opening 70. "Roughly" the same means the range of masses that will allow a forging process to form a bicycle head tube 25.

Preferably, the blank 120 is similar in dimension to the finished head tube 25 to reduce the force needed in the forging process. The blank 120 preferably is roughly the same length as the final head tube 25. For example, if the finished head tube 25 is 112 mm in length, the blank 120 should be formed to a similar length that accounts for expansion length wise during the forging process. The blank 120 should be roughly the width and thickness of the final head tube 25. For example, if the head tube 25 is 50 mm thick and 65 mm wide, the blank 120 should be roughly the those dimensions, accounting for mass displacement.

In one embodiment, preferably a casting 120 (FIG. 12) is used in the forging process. Desirably, the casting 120 approximates the finished shape of the head tube 25. In another embodiment, preferably bar stock of appropriate dimensions can be cut to the approximate length of the head tube 25 and used in the forging process.

Step S130 involves subjecting the blank 120 to a forging process. A ram (preferably as described above) presses the blank 120 into a die (preferably as described above) and forces the blank 120 material conform to the shape of the die and ram face resulting in a partially finished head tube 25, or work piece 130 (FIG. 13). Both the die and the ram hold relieved features to forge into the blank 120. The die or ram can forge complex indentations into the blank 120, such as the non-circular indentations for producing the complex shaped holes 44, 46 on the back side 82 of the head tube 25. After the forging process, the work piece 130 preferably has the external dimensions of the finished head tube 25.

Step S140 involves creating the opening 70. An opening 70 is cut through the work piece 130 length wise (along the steering axis $A_S$) for receiving the steer tube 14 of a fork 18. Any features forged into the work piece 130 with a depth great enough to extend into the volume of material removed by the creation of the opening 70 will produce an additional opening that intersects with the opening 70. For example, the weight reducing holes 44, 46 on the back side 82 of the head tube 25 are preferably formed by the creation of the opening 70 intersecting the depressions corresponding to the holes 44, 46 made by the forging process. Desirably, once the opening 70 is created, the work piece 130 is essentially in the final form of the head tube 25. Creating the opening 70 can include various process steps. One example includes, rough drilling the opening, followed by milling to reduce weight and reaming the area where the head set presses in, such as at the upper and lower portions 74, 72. The step of milling can be performed with a CNC machine. In some embodiments, the opening 70 can be widened by milling, such as in the middle area 76 or the middle of the back side 82 to reduce any unnecessary material and reduce weight.

Step S150 involves providing frame tubing to form the top tube 23 and down tube 27 to complete the head tube junction 200. Preferably the frame tubing is constructed of similar material to the head tube 25 to aid in the ease of attachment. For example, when welding two dissimilar kinds of metal the joint that is formed may not be of expected strength. If the metals are too dissimilar, they may not behave predictably or mix while in the liquid form, and may combine with undesirable characteristics. Alternatively, an additional component, such as a lug, that is capable of being joined to the head tube 25 by welding may be used to connect dissimilar frame material to the head tube 25.

Figure 16:
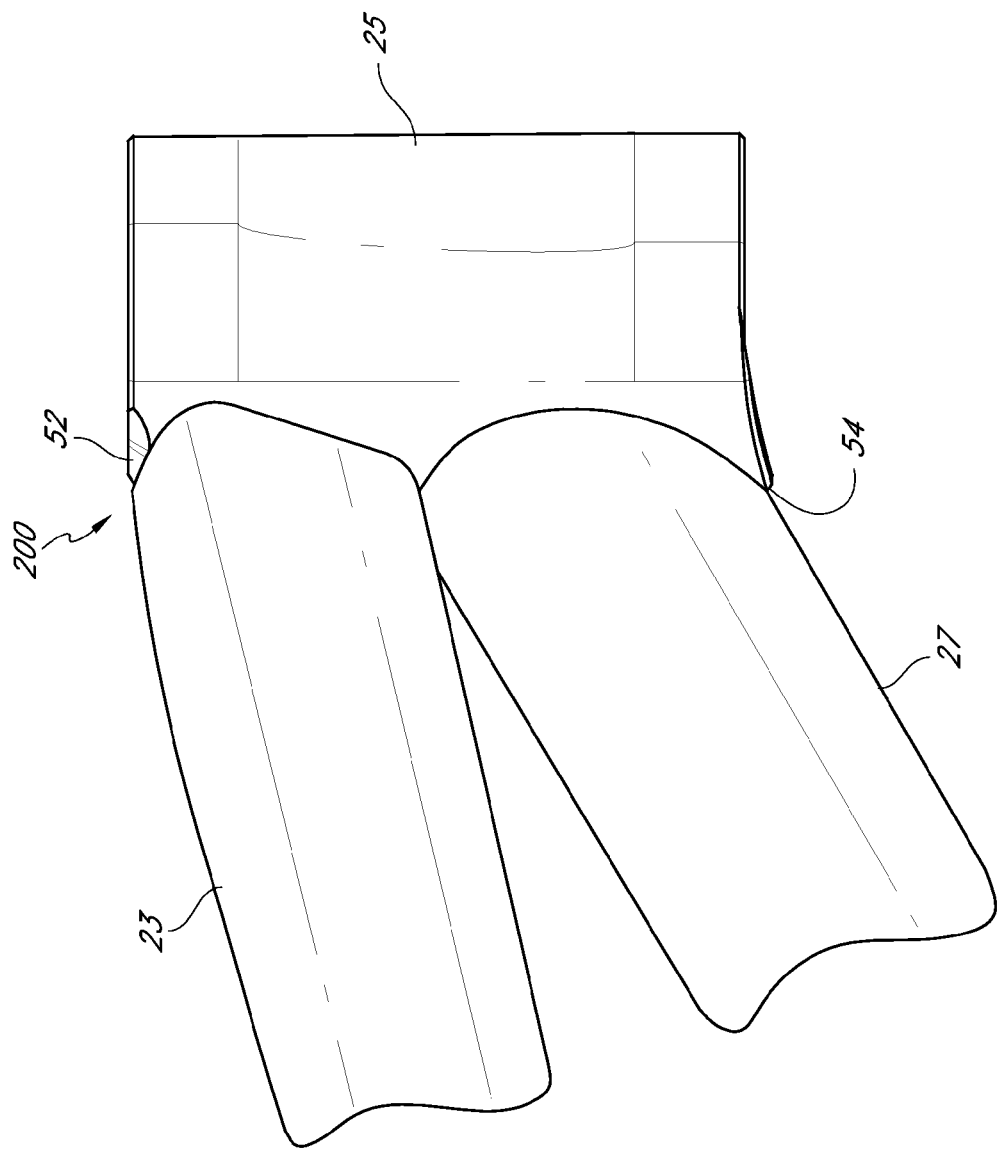
FIG. 16 is a partial, side elevational view of a head tube junction.
Figure 17:
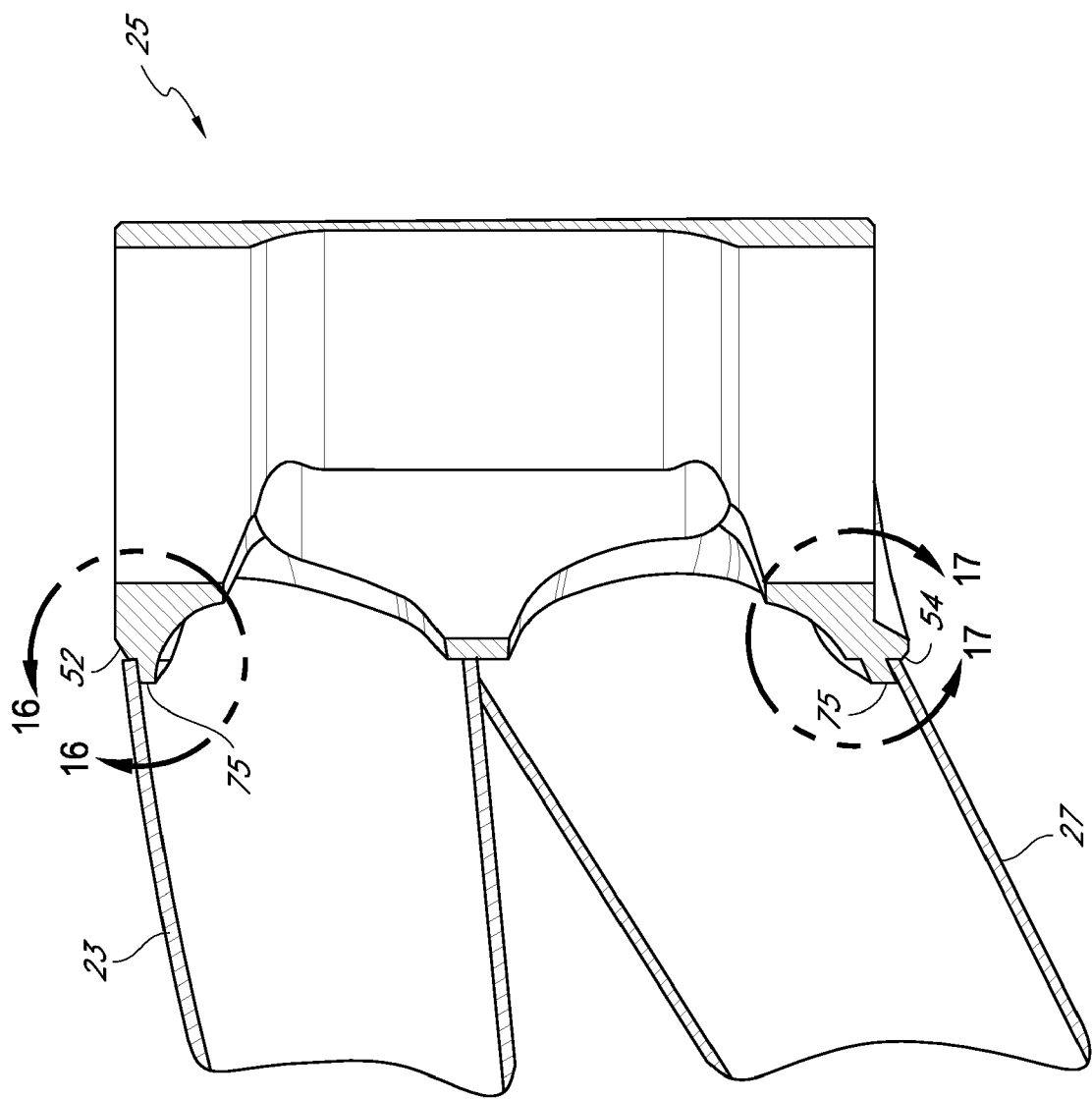
FIG. 17 is a cross-sectional view of the head tube junction of FIG. 16.
Figure 19:
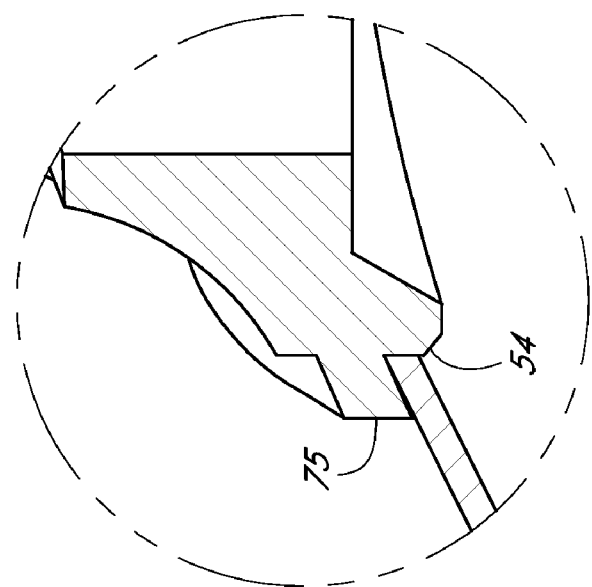
FIGS. 18 and 19 are detail views of the partial cross-sectional view of the head tube junction of FIG. 17, respectively taken along the lines 18-18 and 19-19 of FIG. 15.
Figure 18:
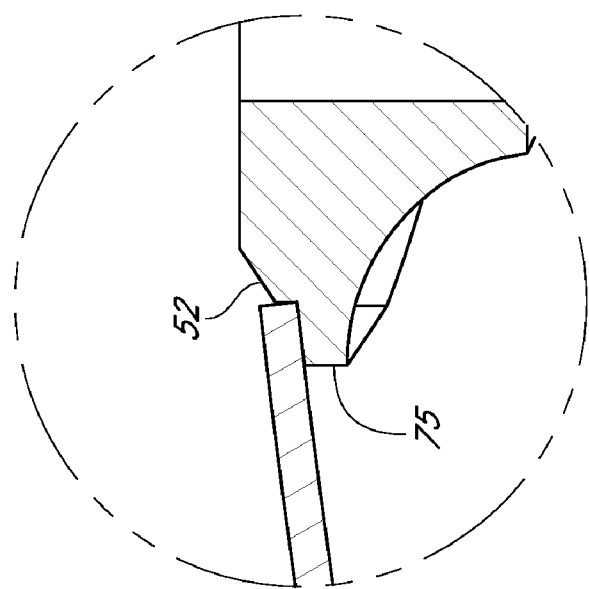
Figure 20:
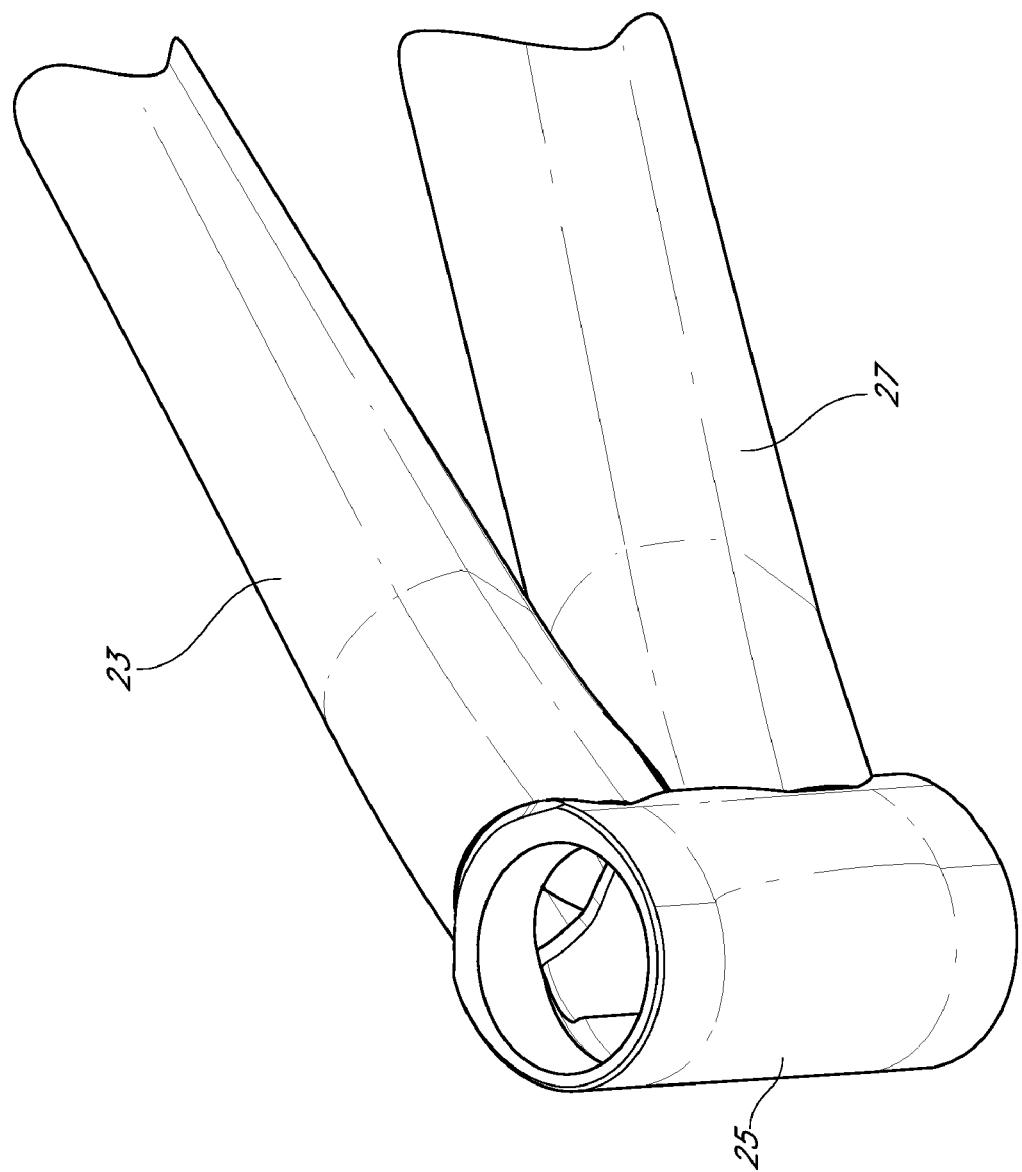
FIG. 20 is a partial, perspective view of a head tube junction.

Step S160 involves cutting a recess into the planar end of the frame tubes, or "mitering" the frame tubes. This allows the end of the top tube 23 and down tube 27 to connect to the head tube 25. The recess cut into the planar end of the frame tubes can depend on the ultimate configuration of the main frame and in some embodiments, one of the top tube 23 and the down tube 27 can be cut to connect to both the head tube and the other of the top tube 23 or down tube 27. As an example, as shown in FIG. 16, the down tube 27 can be cut so that a portion of top of the recess corresponds to an outside surface of the bottom of the top tube 23. As described above the head tube 25, in one embodiment, preferably has a constant radius on the backside 82. A constant radius of the surface 90 on the backside 82 of the head tube 50 allows the use of simple, circular cuts in the mating portions of the frame tubes. In Step S160 of this embodiment, simple radial cuts are cut into the mating ends of the top and down tube 23, 27.

Step S170 involves attaching the head tube 25 to the top tube 23 and down tube 27. Preferably, when working with aluminum tubing a weld is used for joining, for example, TIG welding may be used. By providing a head tube 25 defining an attachment surface 90 and frame tubes (top tube 52 and down tube 54) cut with a corresponding radius recess at the mating ends, the welding process will produce strong, consistent welds, with little gap filling required. Furthermore, such a method allows for the production of a complex shaped head tube 25. Accordingly, the shape of the head tube 25 may be designed, at least in part, in an effort to heat distribution during the welding of the top tube 52 and down tube 54 to the head tube 25, such as by manipulating the amount of material provided near the welding zones of the head tube 25, as will be appreciated by one of skill in the art.

Figure 10:
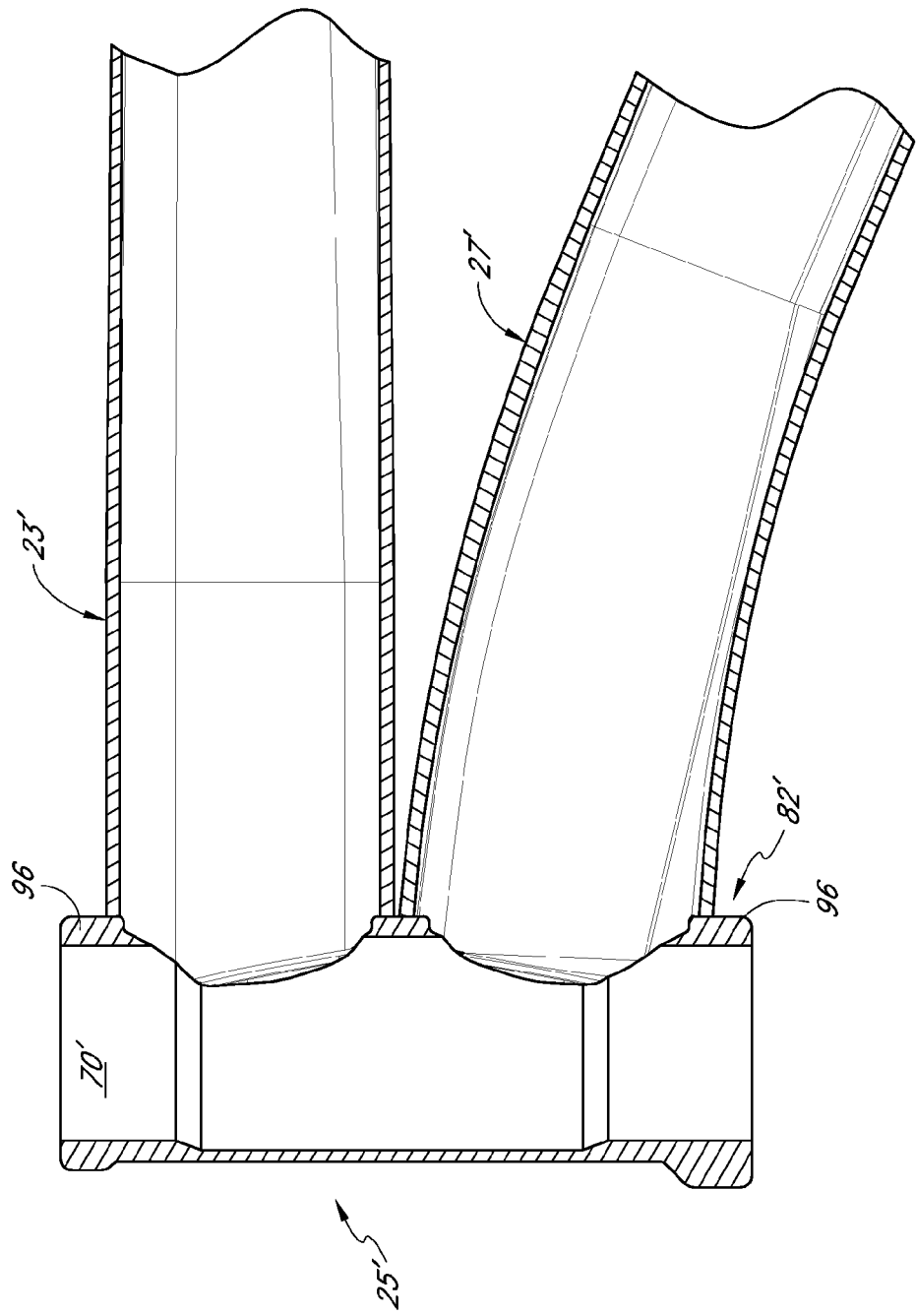
FIG. 10 is a cross-sectional view of a head tube junction of a prior art bicycle frame.
Figure 11:
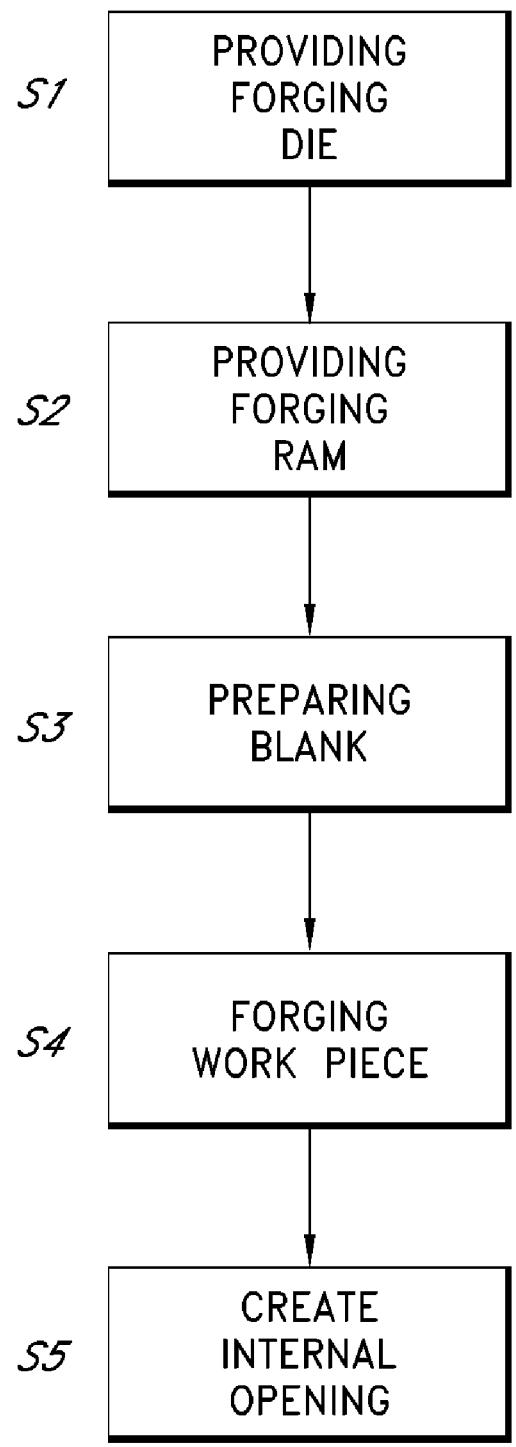
FIG. 11 is a flow chart of a manufacturing method for producing the head tube of FIG. 3.
Figure 12:
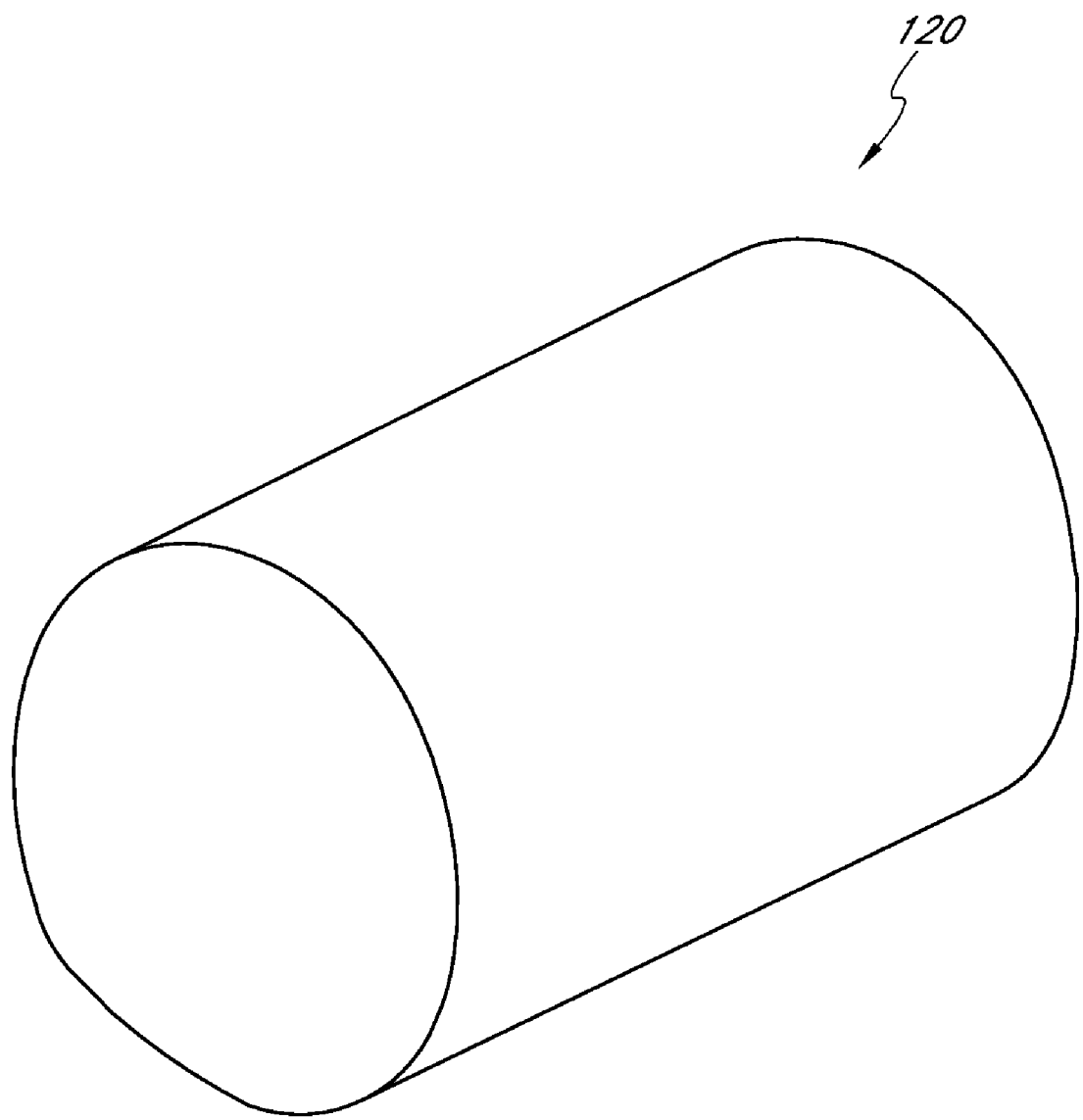
FIG. 12 is a perspective view of a, forging blank used to produce the head tube of FIG. 3.

As discussed previously, on a standard head tube assembly, the top tube meets the head tube at a generally right angle and the weld is placed in this right angle at the extra space 96 (See FIG. 10). This extra space is only need for the right angle weld. Eliminating the space can potentially decrease weight and lower handle bar height, both of which considerations are desirable in certain environments. But, a problem with butt welding with aluminum is lack of weld penetration. The underside of the material from the weld is often not connected.

As shown herein (see for example, FIGS. 16-21), the head tube 25 desirably does not have this right angle and overcomes the problem with butt welding with the use of a ledge 75. The head tube can also use a chamfer 52, 54. The ledge and chamfer can allow for deeper weld penetration and a connection for the underside of the top of the top tube 23, for example. This allows for a "top" or "flush" weld to be performed connecting the top tube 23 and the head tube 25, as well as the down tube 27 to the head tube 25. Further the wall thickness of the backside 82 of the head tube 25 desirably allows the weld bead to be laid on top of the top tube 23 and head tube 25, and not interfere with the headset bore or opening 70. Such a connecting process desirably allows for a shorter head tube 25 to be used. In addition, independent of whether the head tube 25 is shorter than a conventional head tube, the above process may allow the top of the top tube 23 and the bottom of the down tube 27 to be spaced farther apart on the head tube which results in better bracing of the head tube. The ledges 75 are primarily present to aid in welding penetration rather than as structural features. Specifically, the strength of the connection is desirably at least: 60%, 70%, 80%, or 85% due to the strength of the weld.

The ledges 75 are desirably positioned such that they are at the top of the top tube 23 and/or at the bottom of the down tube 27. The ledges 75 can have a length such that they are within the top or down tube. For example, the ledge can contact an inner surface of the tube. The ledge 75 can have an length extending from the surface 90 of the backside 82 of less than: 1 mm, 2 mm, 3 mm, 4 mm and 5 mm. The ledges 75 can be formed such that they are less than: 60%, 50%, 40%, 30%, and 20% of the perimeter of the inner surface of the top or down tube 23, 27.

Figure 21:
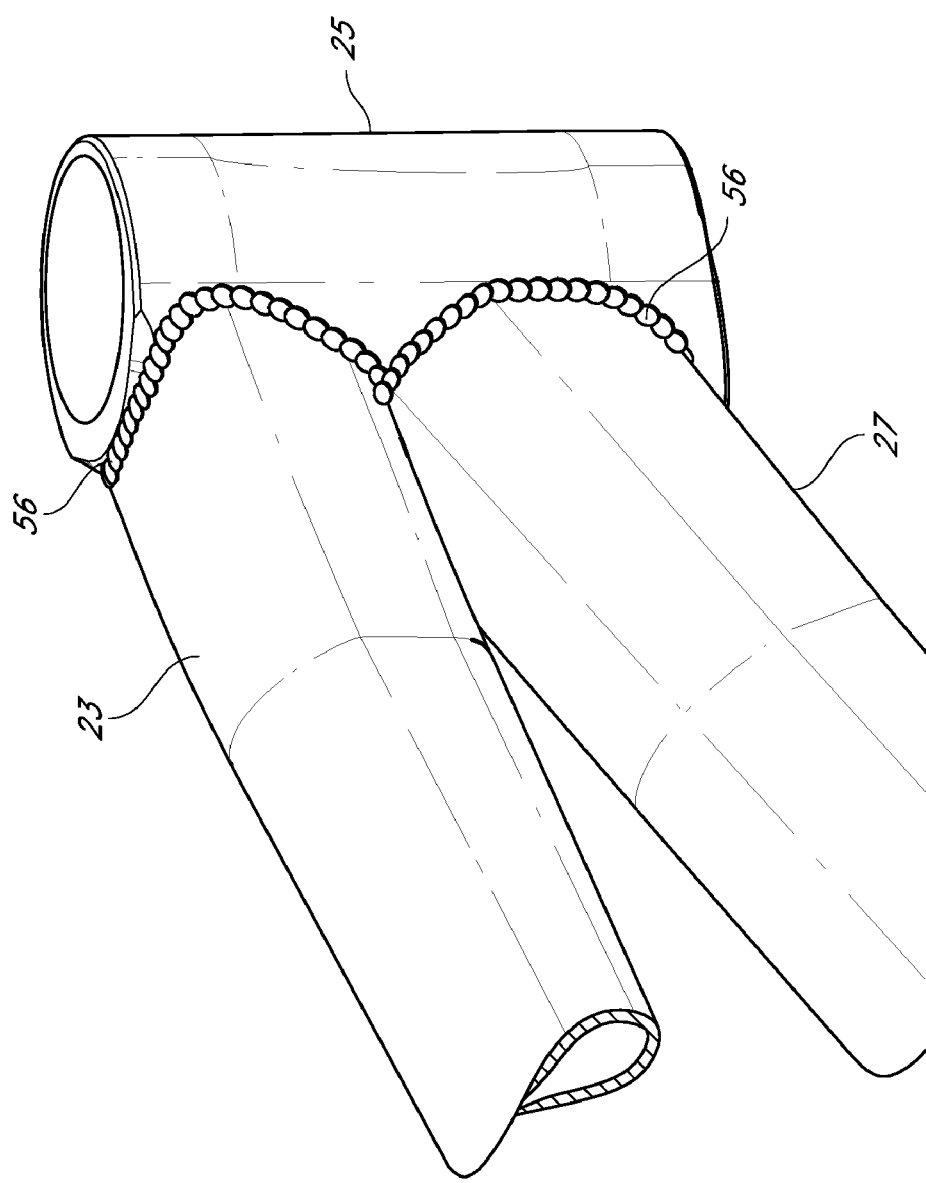
FIG. 21 is a partial, perspective view of a head tube junction produced by the method of FIG. 15.

Referring now to FIG. 21, the head tube junction is shown where the head tube 25, down tube 54 and top tube 52 are joined with the above method to form a head tube junction. This figure illustrates the top tube 23 attached to the back side 82 of head tube 25 with weld 56. The down tube 27 is also secured to head tube 25, and in some embodiments, to the top tube 23 with weld 56. Desirably, each of the top and down tubes 23, 27 are joined to the head tube 25 by a welded, bead along substantially the entire periphery of the tubes 23, 27 and corresponding areas of the surface 90 defining the periphery of the holes 44, 46, as shown. However, in some instances, facing or overlapping surfaces of the top tube 23 and down tube 27 may be welded to one another, rather than to the head tube 25.

Although it is preferred that the process steps S100-S170 are performed in the above-described order to produce a head tube junction 200, the process steps may be completed in an alternative order and still provide advantages over conventional processes for producing head tubes. Furthermore, not all of the steps are necessarily required and additional process steps may be added. Additionally, though a forging and welding process has been described, the head tube can also be formed by other methods. For example, the head tube can be formed from sheet metal using a sheet metal forming process. In some embodiments the process can include various process steps, including bending and stamping. Other materials and/or processes can also be used.

As has been explained, the head tube 25 can be, but is not necessarily, shorter than conventional head tubes. The top of the top tube 23 and the bottom of the down tube 27 can be flush with the top and bottom of the head tube 25, respectively. This can provide better bracing and a stronger assembly then conventional head tubes which have a space 96 between the top and bottom of the head tube and the connecting top and down tubes.

The head tube 25 can have better bracing and lower weight than conventional head tubes. The head tube 25 can be easy to manufacture. The partial butt weld can result in high weld penetration at the main stress points at the top of the top tube and bottom of the down tube. The weld provides structural strength and does not require interlocking tubing.

As compared to previous bicycle frames, it has been found that in some embodiments of the head tube 25 described herein ultimate strength has increased by 30-40%. The fatigue life is about the same as prior designs, but this is with thinner tubes and a shorter head tube, both of which have historically been found to create a weaker structure.

Ultimate strength is enhanced by is the ability to put the tubes as wide as possible, meaning the top tube is higher and the down tube is lower on the head tube. The flush configuration desirably allows for maximum spread of the top and down tubes with the head tube 25. Further the ledges, chamfer, and/or the thicker rear wall of the head tube can facilitate the possibility of moving the tubes wider.

Fatigue life is likely increased because of the shape of the head tube forging, including the chamfers which are conducive to a deep and penetrating weld. The wide placement of the tubes detailed above is also believed to increase fatigue life.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle assembly comprising:
  a main frame comprising a top tube, a down tube and a head tube, wherein the top and down tubes are connected to the head tube, the head tube comprising:
  an internal bore having an internal bore surface;
  a front wall;
  a first ledge extending from a back wall and within the top tube; and
  a first surface proximate a top of the head tube; and
  a weld bead mating the head tube and top tube, wherein the weld bead sitting on the first surface and a tubular outer surface of the top tube, the weld bead spaced from the bore;
  wherein the first surface defines a space for the weld bead to contact an end surface of the top tube, the first surface comprising a chamfer.

2. The bicycle assembly of claim 1, further comprising a second ledge extending from the back wall and within the down tube.

3. The bicycle assembly of claim 1, wherein the back wall has a thickness greater than the thickness of the front wall.

4. The bicycle assembly of claim 1, further comprising a second chamfer on a bottom of the head tube.

5. The bicycle assembly of claim 1, further comprising a headset, wherein part of the headset is within the bore and the weld bead is spaced from the headset.

6. The bicycle assembly of claim 1, wherein the weld bead is flush with the top of the head tube.

7. The bicycle assembly of claim 1, wherein the head tube further comprises two openings on the back wall.

8. The bicycle assembly of claim 1, further comprising a fork, a saddle, a rear wheel and a front wheel.

9. A bicycle assembly comprising:
   a main frame comprising a top tube, a down tube and a head tube, wherein the top and down tubes are connected to the head tube, the head tube comprising:
      an internal bore having an internal bore surface;
      a front wall;
      a back wall having a thickness greater than the thickness of the front wall; and
      a first ledge extending from the back wall and within either the top tube or the down tube;
   wherein a top of the top tube is connected to a top of the head tube and the back wall.

10. The bicycle assembly of claim 9, wherein the top of the head tube comprising a chamfer and the top of the top tube connected to the chamfer by a weld.

11. The bicycle assembly of claim 10, wherein the weld is flush with a top planar surface of the top of the head tube.

12. The bicycle assembly of claim 9, wherein the first ledge extends within the top tube and further comprising a second ledge extending from the back wall and within the down tube.

13. The bicycle assembly of claim 12, further comprising a second chamfer on a bottom of the head tube.

14. The bicycle assembly of claim 9, further comprising a fork, a saddle and two wheels.

15. A bicycle assembly comprising:
   a main frame comprising a top tube, a down tube and a head tube, wherein the top and down tubes are connected to the head tube, the top tube comprising:
      a tubular outer wall;
      a tubular inner wall; and
      an end surface
   the head tube comprising:
      an internal bore having an internal bore surface;
      a front wall;
      a first ledge extending from a back wall, within the top tube and contacting the tubular inner wall; and
      a first surface on a top of the head tube; and
   a weld bead mating the head tube and top tube, wherein the weld bead sitting between the first surface and the first ledge on the head tube and the tubular outer wall of the top tube, the weld bead being flush with the top of the head tube and spaced from the bore.

16. A method of manufacturing a bicycle assembly comprising:
   providing a forging die containing at least a partial relieved form of a head tube;
   providing a forging ram containing at a partial relieved form of said head tube;
   providing a blank of roughly the external dimensions of said head tube;
   utilizing said forging die and said forging ram to forge said blank into a work piece defining the external dimensions of the head tube;
   creating an internal opening in said work piece that defines a first axis and is sized and shaped for receiving a bicycle steer tube therethrough;
   wherein said forging of said blank into said work piece and creating the internal opening comprises forming a internal opening such that a thickness of the front of the head tube is less than the thickness of the back of the head tube along a horizontal plane from front to back; and
   welding a top tube and a down tube to said head tube;
   wherein welding comprises flush welding at least a portion of the top of the top tube and the head tube.

17. The method of claim 16, wherein welding further comprises welding a top of the top tube to a top of the head tube and a bottom of the down tube to a bottom of the head tube.

18. The method of claim 16, wherein welding further comprises flush welding at least a portion of the bottom of the down tube and the head tube.

19. A method of manufacturing a bicycle assembly comprising:
   providing a forging die containing at least a partial relieved form of a head tube;
   providing a forging ram containing at a partial relieved form of said head tube;
   providing a blank of roughly the external dimensions of said head tube;
   utilizing said forging die and said forging ram to forge said blank into a work piece defining the external dimensions of the head tube;
   creating an internal opening in said work piece that defines a first axis and is sized and shaped for receiving a bicycle steer tube therethrough;
   wherein said forging of said blank into said work piece and creating the internal opening comprises forming a internal opening such that a thickness of the front of the head tube is less than the thickness of the back of the head tube along a horizontal plane from front to back; and
   welding a top tube and a down tube to said head tube;
   wherein welding comprises flush welding at least a portion of the bottom of the down tube and the head tube.

20. The method of claim 19, wherein welding further comprises welding a top of the top tube to a top of the head tube and a bottom of the down tube to a bottom of the head tube.

21. The method of claim 19, wherein welding further comprises flush welding at least a portion of the top of the top tube and the head tube.

* * * * *